(12) United States Patent
Bowen et al.

(10) Patent No.: US 11,997,222 B1
(45) Date of Patent: May 28, 2024

(54) CERTIFICATE AUTHORITY

(71) Applicant: Amazon Technologies, Inc., Seattle, WA (US)

(72) Inventors: Peter Zachary Bowen, Bainbridge Island, WA (US); Todd Lawrence Cignetti, Ashburn, VA (US); Preston Anthony Elder, III, Fairfax, VA (US); Brandonn Gorman, Seattle, WA (US); Ronald Andrew Hoskinson, Herndon, VA (US); Jonathan Kozolchyk, Seattle, WA (US); Kenneth Lawler, Seattle, WA (US); Marcel Andrew Levy, Seattle, WA (US); Kyle Benjamin Schultheiss, Centreville, VA (US); Sandeep Shantharaj, Herndon, VA (US); Param Sharma, Haymarket, VA (US); Jose Maria Silveira Neto, Herndon, VA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/732,362

(22) Filed: Apr. 28, 2022

Related U.S. Application Data

(63) Continuation of application No. 16/018,004, filed on Jun. 25, 2018, now Pat. No. 11,323,274.
(Continued)

(51) Int. Cl.
*H04L 9/32* (2006.01)
*H04L 9/08* (2006.01)

(52) U.S. Cl.
CPC .......... *H04L 9/3268* (2013.01); *H04L 9/0897* (2013.01); *H04L 9/3247* (2013.01); *H04L 9/3297* (2013.01)

(58) Field of Classification Search
CPC ... H04L 9/3268; H04L 9/0897; H04L 9/3247; H04L 9/3297
See application file for complete search history.

(56) References Cited

U.S. PATENT DOCUMENTS 6,035,402 A    3/2000  Vaeth et al.
6,671,804 B1  12/2003  Kent
(Continued)

OTHER PUBLICATIONS

Cooper et al., "Internet X.509 Public Key Infrastructure Certificate and Certificate Revocation List (CRL) Profile," Request for Comments: 5280, May 2008, 141 pages.
(Continued)

*Primary Examiner* — Khalid M Almaghayreh
(74) *Attorney, Agent, or Firm* — Davis Wright Tremaine LLP

(57) ABSTRACT

A computing resource service provider provides a certificate management service that allows customers of the computing resource service provider to create, distribute, manage, and revoke digital certificates issued by private certificate authorities. A private certificate authority hosted by the computing resource service provider is able to issue signed certificates to network entities within the customer enterprise. The certificate management service provides a network-accessible application programming interface to the private certificate authority that allows applications to create and deploy private certificates programmatically. The system provides the flexibility to create private certificates for applications that require custom certificate lifetimes or resource names.

20 Claims, 13 Drawing Sheets

Related U.S. Application Data

(60) Provisional application No. 62/652,240, filed on Apr. 3, 2018.

(56) References Cited

U.S. PATENT DOCUMENTS

| | | | |
|---|---|---|---|
| 7,395,428 | B2 | 7/2008 | Williams et al. |
| 7,484,089 | B1* | 1/2009 | Kogen .................. H04L 63/062 726/10 |
| 7,526,642 | B2 | 4/2009 | Hurtta et al. |
| 7,644,270 | B1 | 1/2010 | Cherukumudi et al. |
| 7,937,583 | B2 | 5/2011 | Thornton et al. |
| 8,250,361 | B2 | 8/2012 | Kido et al. |
| 8,370,626 | B2 | 2/2013 | Liu et al. |
| 8,494,485 | B1 | 7/2013 | Broch |
| 8,806,195 | B2 | 8/2014 | Wnuk et al. |
| 8,843,636 | B1* | 9/2014 | Wu .......................... H04L 69/04 709/233 |
| 9,032,473 | B2* | 5/2015 | Guccione .............. H04W 8/205 713/153 |
| 9,215,231 | B1* | 12/2015 | Bowen ................ H04L 63/1416 |
| 9,306,935 | B2 | 4/2016 | Bowen |
| 9,332,002 | B1 | 5/2016 | Bowen |
| 9,455,838 | B2* | 9/2016 | Gallagher ............... H04L 9/321 |
| 9,485,101 | B2 | 11/2016 | Bowen |
| 9,552,485 | B1 | 1/2017 | Cignetti et al. |
| 9,730,065 | B1 | 8/2017 | Chen |
| 9,773,127 | B2* | 9/2017 | Yanagi .................... H04L 9/321 |
| 9,778,939 | B2 | 10/2017 | Johansson et al. |
| 9,979,553 | B2 | 5/2018 | Kommireddy et al. |
| 10,425,399 | B2 | 9/2019 | Kravitz et al. |
| 2004/0039925 | A1* | 2/2004 | McMillan ............... H04L 63/12 713/150 |
| 2005/0021969 | A1 | 1/2005 | Williams et al. |
| 2005/0033957 | A1* | 2/2005 | Enokida .................. H04L 63/12 726/4 |
| 2005/0069136 | A1 | 3/2005 | Thornton et al. |
| 2005/0076203 | A1* | 4/2005 | Thornton ............... H04L 9/3263 713/156 |
| 2006/0200857 | A1 | 9/2006 | Yokota |
| 2007/0055882 | A1* | 3/2007 | Gaucas ................. H04L 63/0823 713/175 |
| 2008/0091952 | A1* | 4/2008 | Sumner ................. H04L 63/064 713/185 |
| 2008/0183853 | A1 | 7/2008 | Manion et al. |
| 2009/0319783 | A1 | 12/2009 | Thornton et al. |
| 2010/0031025 | A1 | 2/2010 | Zhang et al. |
| 2010/0228970 | A1* | 9/2010 | Oka .......................... H04L 9/14 713/156 |
| 2010/0268942 | A1* | 10/2010 | Hernandez-Ardieta ..................... H04L 9/3268 713/156 |
| 2010/0275012 | A1 | 10/2010 | Kido et al. |
| 2011/0113240 | A1 | 5/2011 | Fu et al. |
| 2011/0197061 | A1* | 8/2011 | Chou .................... H04L 9/3265 713/156 |
| 2011/0213961 | A1 | 9/2011 | Wnuk et al. |
| 2011/0219227 | A1* | 9/2011 | Sharif ................. H04L 63/0823 713/158 |
| 2012/0023327 | A1 | 1/2012 | Nagasaki |
| 2012/0023560 | A1* | 1/2012 | Yanagi .................. G06F 21/645 726/6 |
| 2012/0179907 | A1* | 7/2012 | Byrd ..................... H04L 9/3268 713/156 |
| 2013/0254535 | A1* | 9/2013 | Akehurst .................. H04L 9/32 713/158 |
| 2013/0339740 | A1* | 12/2013 | Ben-Shalom ....... H04L 63/0876 713/175 |
| 2014/0181911 | A1 | 6/2014 | Kula |
| 2015/0172064 | A1* | 6/2015 | Takenaka ............... H04L 9/3247 713/156 |
| 2015/0222604 | A1* | 8/2015 | Ylonen .................. H04L 9/3263 713/171 |
| 2015/0236860 | A1* | 8/2015 | Brown .................. H04L 9/3247 713/156 |
| 2015/0244707 | A1 | 8/2015 | Bowen |
| 2015/0254451 | A1 | 9/2015 | Doane et al. |
| 2016/0057132 | A1 | 2/2016 | Gibson et al. |
| 2016/0142216 | A1* | 5/2016 | Turner .................... H04L 9/006 713/156 |
| 2016/0173286 | A1* | 6/2016 | Gallagher ............... H04L 9/321 713/156 |
| 2016/0173287 | A1 | 6/2016 | Bowen |
| 2016/0182494 | A1 | 6/2016 | Lissounov et al. |
| 2016/0211978 | A1* | 7/2016 | Bowen .................... G06F 21/33 |
| 2016/0261563 | A1 | 9/2016 | Walter et al. |
| 2016/0323104 | A1* | 11/2016 | Mayers ............... H04L 63/0407 |
| 2016/0342429 | A1* | 11/2016 | Johansson ............. G06F 9/4406 |
| 2017/0006022 | A1* | 1/2017 | Gunti .................. H04L 63/0823 |
| 2017/0012786 | A1 | 1/2017 | Gallagher |
| 2017/0012967 | A1* | 1/2017 | Holloway ........... H04L 63/0823 |
| 2017/0041151 | A1 | 2/2017 | Kommireddy et al. |
| 2017/0048071 | A1* | 2/2017 | Ignatchenko ....... H04L 63/0428 |
| 2017/0093587 | A1* | 3/2017 | Glisson ................. H04L 63/062 |
| 2017/0118197 | A1 | 4/2017 | Murthy et al. |
| 2017/0195122 | A1* | 7/2017 | Obaidi .................. H04L 9/0866 |
| 2017/0222981 | A1 | 8/2017 | Srivastav et al. |
| 2017/0228412 | A1 | 8/2017 | Agarwal et al. |
| 2017/0279785 | A1 | 9/2017 | Kent |
| 2018/0019993 | A1 | 1/2018 | Kravitz et al. |
| 2018/0139061 | A1* | 5/2018 | Glisson .................... H04L 9/321 |
| 2018/0219678 | A1* | 8/2018 | Medvinsky ........... H04L 9/3268 |
| 2018/0287804 | A1* | 10/2018 | Geisbush ............ H04L 63/0442 |
| 2019/0074982 | A1* | 3/2019 | Hughes .................. H04L 9/0863 |
| 2019/0207772 | A1 | 7/2019 | Hecht et al. |
| 2019/0245700 | A1 | 8/2019 | Dobre et al. |

OTHER PUBLICATIONS

CSS Research, "Digital Certificate Template Best Practices White Paper," © 2018 Certified Security Solutions, <https://info.css-security.com/white-papers-certificate-templates> [retrieved Oct. 23, 2018], 7 pages.

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from https://nvlpubs.nist.gov/nistpubs/Legacy/SP/nistspecialpublication800-107r1.pdf, 25 pages.

DigiCert, "Digital Certificates for Every Security Need," © 2018 DigiCert, Inc., <https://www.digicert.com/digital-certificates> [retrieved Oct. 23, 2018], 4 pages.

DigiCert, "Symantec Private Certification Authority Service (Private CA)," © 2018 DigiCert, Inc., <https://www.websecurity.symantec.com/security-topics/private-ssl> [retrieved Oct. 23, 2018], 9 pages.

Nystrom et al., "PKCS #10: Certification Request Syntax Specification Version 1.7," Request for Comments 2986, Nov. 2000, 14 pages.

Nystrom et al., "PKCS #9: Selected Object Classes and Attribute Types Version 2.0," Request for Comments 2985, Nov. 2000, 42 pages.

* cited by examiner

CERTIFICATE AUTHORITY

CROSS-REFERENCE TO RELATED APPLICATIONS

This application is a continuation of U.S. patent application Ser. No. 16/018,004, filed Jun. 25, 2018, entitled "CERTIFICATE AUTHORITY," which claims the benefit of U.S. Provisional Patent Application No. 62/652,240, filed Apr. 3, 2018, entitled "PRIVATE CERTIFICATE AUTHORITY," the disclosure of which is herein incorporated in its entirety. This application also incorporates by reference for all purposes the full disclosure of co-pending U.S. patent application Ser. No. 16/018,009, filed Jun. 25, 2018, entitled "CERTIFICATE GENERATION METHOD," which claims the benefit of U.S. Provisional Patent Application No. 62/652,235, filed Apr. 3, 2018, entitled "CERTIFICATE TEMPLATE SYSTEM," and co-pending U.S. patent application Ser. No. 16/018,014, filed Jun. 25, 2018, entitled "CERTIFICATE MANAGER," which claims the benefit of U.S. Provisional Patent Application No. 62/652,236, filed Apr. 3, 2018, entitled "CERTIFICATE MANAGEMENT SYSTEM."

BACKGROUND

Computer-based transactions are an important part of running a modern business. By performing operations in a computing environment, transaction data can be exchanged electronically between parties over a computer network, thereby allowing the transactions to occur quickly over great distances. However, when exchanging data over a publicly accessible computer network, it takes considerable resources to prevent third parties from interfering with the transaction by impersonating one of the parties or by altering the transaction data. In order to mitigate this risk, a digital certificate may be used to prove the identity of the certificate owner. Digital certificates are widely used to authenticate the exchange of information between computer systems and therefore, providing improved systems for managing and using digital certificates is an important problem.

BRIEF DESCRIPTION OF THE DRAWINGS

Various techniques will be described with reference to the drawings, in which.

DETAILED DESCRIPTION

Figure 1:
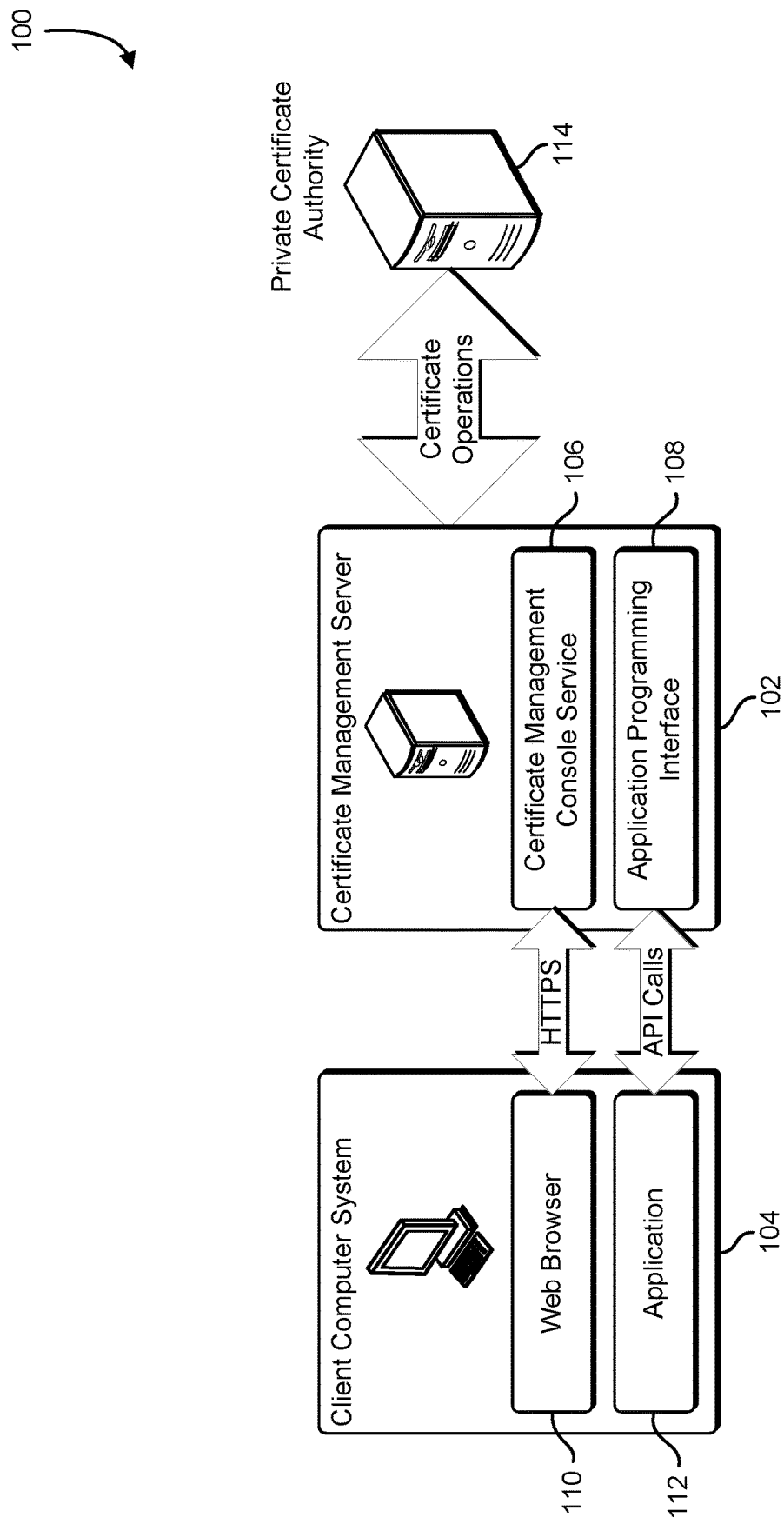
FIG. 1 illustrates an example of a certificate management server that provides an application programming interface ("API") to perform certificate management operations, in an embodiment.

The present document describes a system and method for generating and managing digital certificates. In an embodiment, a computing resource service provider ("CRSP") provides a certificate manager ("CM") service that allows customers to create, distribute, manage, and revoke digital certificates issued by a public and/or private certificate authority ("PCA"). In an embodiment, the CRSP provides the CM service to the customer via a web interface and the customer accesses the CM via a web browser. In an embodiment, the CM allows the customer to generate a PCA that is hosted by the CRSP and controlled by the customer. In an embodiment, the customer uses the PCA to issue digital certificates for entities within the customer's internal network which are signed with a private key of the PCA. In an embodiment, the PCA is accessible via an application programming interface ("API"). In an embodiment, the API is a network-accessible web API. In an embodiment, the CM provides the customer with an interface for the management of private certificates by interfacing with the PCA via the API. By providing a certificate manager and the ability to create private certificate authorities and associated digital certificates, a computing resource service provider is able to provide a service that has significant advantages over both conventional certificate authorities ("CAs") and private certificate authorities deployed and managed within a customer datacenter.

In an embodiment, the certificate management service is usable via one or more interfaces. In an embodiment, the certificate management service provides a web based or other remotely accessible application programming interface ("API"). The API allows customer applications to create and manage private certificate authorities and to perform certificate management operations programmatically. In an embodiment, certificate management operations may include creating a digital certificate, revoking a digital certificate, renewing a digital certificate, exporting a digital certificate, or importing a digital certificate. In an embodiment, the certificate management service provides a graphical user interface in the form of a website with a collection of interactive webpages for performing various operations on private certificate authorities and digital certificates. In an embodiment, the certificate management service provides a command line interface ("CLI") that allows for digital-certificate and certificate-authority operations to be performed via a text-based interactive console or a programmatic script.

In an embodiment, a certificate authority ("CA") issues a certificate by validating that a public key belongs to a named resource such as a server, creating a certificate containing both the name and the public key, and digitally signing the certificate to assert that the public key belongs to the resource. In an embodiment, a CA issues a certificate to identify a host by signing a certificate request provided by an authorized requester. In an embodiment, once issued, the host may present the certificate to other hosts as proof of its identity. In an embodiment, a host is said to trust a CA if the CA's certificate is represented in a database of trusted CAs maintained by the host, often referred to as a trust store. In an embodiment, a trust store is a list of trusted CA certificates stored by the host's operating system or by one or more applications on the host computer system. In an embodiment, a trust store may be maintained by a web browser or a web server that is running on the host. In an embodiment, applications on the host may access a trust store maintained and stored by the operating system of the host. In an embodiment, because certificates may be used as a basis of trust and identity for many applications, it is important that CAs be operated securely and only issue certificates when authorized to do so. In an embodiment, revocation is provided as an additional CA function. In an embodiment, revoking a certificate distrusts the certificate and communicates to clients and other relying parties that the certificate is no longer trusted. For example, a certificate identifying a host can be revoked if the host is compromised. In an embodiment, when a certificate of a host is revoked, applications that rely on the certificate stop trusting the host as a result. Collectively, this system of establishing trust based on CAs, certificates, and public key cryptography is known as public key infrastructure ("PKI").

In an embodiment, a Hosted Private Certificate Authority ("HPCA") is provided. An HPCA is a hosted certificate authority service which allows enterprises and Internet of things ("IoT") customers to create a private CA using, in some embodiments, a computing resource service provider to do the work of creating, managing and securing certificate authority certificates, private certificates, and real-time services that vend certificate state. By using a PCA hosted by a service provider, in various embodiments, customers are provided with security, configuration, management, and monitoring of a high availability PCA, without hiring a security and maintenance team. In an embodiment, an HPCA is provided as a feature of a Certificate Manager which is also provided by the computing resource service provider. In an embodiment, the HPCA allows customers to manage their certificates from a console and perform operations such as creating, rotating, and revoking both public and private certificates. In an embodiment, the CM manages certificate renewal for certificates controlled by the customer including private certificates issued by the HPCA. By providing managed certificate renewal, the CM is able to reduce outages caused by certificate expiration. In an embodiment, customers may use the HPCA to deploy private certificates on various computing resources provided by the CRSP, including load balancers, content delivery networks ("CDNs"), and application programming interface Gateway endpoints. In an embodiment, customers can export private certificates from the HPCA and deploy them on other services and endpoints not associated with the CRSP.

In an embodiment, the Certificate Manager, in coordination with the Private Certificate Authority ("CM/PCA") is a managed private CA service that helps customers manage the lifecycle of their private certificates. In an embodiment, the CMPCA provides the customer with a high-availability private CA service without the upfront investment and ongoing maintenance costs of operating their own private CA. In an embodiment, CM/PCA extends the CM's certificate management capabilities to private certificates, allowing the customer to manage public and private certificates centrally. In an embodiment, the CM renews customer private certificates automatically. In an embodiment, the customer can create and deploy private certificates for resources of the CRSP using the CM or using an API provided by the CM. In an embodiment, CM/PCA allows developers to be more productive by providing them with APIs that create and deploy private certificates programmatically. In an embodiment, customers also have the ability to create private certificates for applications that require custom certificate lifetimes or resource names. In an embodiment, CM/PCA allows the customer to create and manage private certificates for their connected resources in one place with a secure, pay as you go, managed private CA service.

In an embodiment, the CM is a set of executable instructions stored in a memory on a computer system operated by the computing resource service provider. As a result of executing the set of executable instructions on one or more processors of the computer system, the executable instructions cause the computer system to perform the operations described herein that are attributable to the CM. In various embodiments, operations attributed to the CM include transmitting webpages over computer network that, when processed by a browser on the client computer system operated by a customer, cause a user interface to be presented to the customer. In an embodiment, the executable instructions cause information to be exchanged between the computer system operated by the computing resource service provider and the client computer system. In an embodiment, the information includes instructions and parameters that cause the computer system to generate and manage digital certificates and interact with both public and private certificate authorities.

In an embodiment, CM/PCA provides the customer with a private CA service. In an embodiment, the addition of PCA management functions to the CM extends the CM's certificate management capabilities to private certificates, enabling the customer to manage public and private certificates centrally and have the CM renew the private certificates of the customer. In an embodiment, the customer is able to create and deploy private certificates for resources of the computing resource service provider using a Management Console or an application programming interface provided by the CM. In an embodiment, the CM provides a common tool for both creating and managing a CA, and for creating and managing public and private certificates. For example, a customer can create an online private CA and, from the same console, create and deploy certificates issued from their online private CA.

In an embodiment, the PCA is implemented with one or more hardware security modules ("HSMs") (such as a cloud-based HSM) that retain keys and perform cryptographic functions related to the creation, renewal, and management of digital certificates. In an embodiment, a set of cryptographic keys used by the PCA is stored in an HSM. In an embodiment, the set of cryptographic keys is encrypted with a master key maintained in the HSM, and the resulting encrypted set of cryptographic keys can be exported, allowing the HSM to be reallocated by the computing resource service provider for other uses. In an embodiment, if the PCA needs to use the set of cryptographic keys, the PCA can provide the encrypted set of keys to the HSM (or another HSM having the master key), and the HSM can decrypt and restore the set of cryptographic keys. In this way, a large number of PCAs can be deployed by the computing resource service provider with a limited number of HSM's, resulting in a lower cost solution for the customer.

In an embodiment, the system provides templates for use in generating and managing digital certificates. In an embodiment, templates are resources for defining policy rules and settings for certificates issued by a private CA. In an embodiment, the customer, acting as the administrator of a Private CA may create and use templates to control the information included in the certificates issued by their CAs. In an embodiment, the administrator uses templates to set policy rules for their CAs and default settings for the certificates issued by their CAs. In an embodiment, the customer/administrator can control what information does or does not go into certificates and can create rules for rejecting certificate requests that don't follow the rules.

In an embodiment, users that want a Private CA-issued certificate are required to specify a template when making a certificate request. In an embodiment, when a user requests a certificate, the user must specify a Template which determines the rules and settings for that certificate. In an embodiment, the Private CA service processes rules and settings from the Template when processing incoming certificate requests. In an embodiment, the Private CA service may modify the request and pass it on to be issued, pass it on unmodified, or reject the request, depending on the contents of the request and of the Template.

In an embodiment, the customer can enable cross-account resource sharing by authorizing other accounts of the CRSP to use the customer's PCA instance. In an embodiment, the customer may obtain the status of the PCA though the CM using an implementation of the online certificate status protocol ("OCSP"). In an embodiment, the CM allows the customer to create templates for CA and client certificates. For example, in an embodiment, customers can customize x509v3 certificate extensions or the contents of certificate extensions. In an embodiment, the CM allows the customer to manage approval workflows for the issuing certificate (Registration Authority ("RA") integration). In an embodiment, the CM supports virtual private network endpoints for PCA public APIs.

In an embodiment, PCA provides improved security by carefully managing how the private key for the CA is generated and protected and how access to the private key is controlled. In an embodiment, the system takes additional steps to secure the workflows and prevent unauthorized issuance by using signing keys at each step of the workflow.

As one skilled in the art will appreciate in light of this disclosure, certain embodiments are capable of achieving certain advantages, including some or all of the following: (1) in an embodiment, the system provides the flexibility to create private certificates for applications that require custom certificate lifetimes or resource names, (2) a private certificate authority provides improved security by managing how the private key for the CA is generated and protected, and how access to the private key is controlled.

Working with public certificate authorities to acquire and manage a large set of digital certificates for an enterprise can be difficult and expensive. To address this problem, some customers may attempt to deploy and operate their own private certificate authority that is able to issue digital certificates within the customer's enterprise which are signed using a cryptographic key controlled by the customer. However, running a private CA involves complex security work that is expensive, easy to get wrong and requires specialized talent. Operating a PCA requires that the customer create and secure (physically and digitally) a root certificate, which is the cryptographic building block upon which the enterprise's private certificates are issued. The customer also has to track the current state of each certificate. Applications, services, and devices need to evaluate the status of a certificate each time a connection is made between two of the enterprise's entities, making the management of the certificates an important part of maintaining running systems. Finally, enterprises that operate their own private PCA generally need to issue certificates, rotate certificates when they expire, and manage revocations as needed. This is a significant burden that many customers cannot manage. If an enterprise is unable to manage the deployment and operation of a private CA, an administrator of the enterprise could choose to not secure their network entities at all, or to secure them with "self-signed certificates" that enable secure protocols such as HTTPS to be used, but without validating the identities of the entities may provide a false sense of security.

The advantages of an embodiment of the CM/PCA can be described by way of the following example. In the following example, Alex is an external customer. Alex wants to issue private certificates. The CM/PCA simplifies this process by allowing Alex to create a new Private CA which is managed by a computing resource service provider. Alex can manage access to the CA and issue and revoke certificates without needing to operate or maintain the associated infrastructure. In an embodiment, Alex need not worry about certificate expirations because the CM takes care of certificate renewals automatically. In an embodiment, Alex can create a subordinate CA or a root CA. In an embodiment, the PCA provides Alex with visibility on how the private key for her CA is being used via system logs. In an embodiment, the PCA can also generate an audit report that shows the certificates issued from a CA.

FIG. 1 illustrates an example of a certificate management server that provides an application programming interface ("API") to perform certificate management operations, in an embodiment. In an embodiment, a system 100 includes a certificate management server 102 that provides certificate management services to a client computer system 104. The certificate management server 102 may be a server computer system, server cluster, virtual computer system, computer runtime, or computing appliance having one or more processors and physical computer-readable memory storing instructions that, as a result of being executed by the one or more processors, implement a certificate management console service 106 and an application programming interface 108. In an embodiment, the certificate management console service 106 and the application programming interface 108 are comprised of executable instructions stored on the memory of the certificate management server 102. In the present document, when reference is made to a service or software component performing a particular function or operating in a certain way, it is understood that the instructions associated with the service or component are executed by a processor on a computer system that hosts the service or software component, thereby causing the computer system to perform the recited function or operation.

In an embodiment, the certificate management console service 106 provides a Web server with a collection of webpages that can be served to the client computer system 104 over a network. In an embodiment, when rendered on a web browser 110 the webpages provide a graphical user interface for performing various certificate management functions. In an embodiment, certificate management functions may include certificate revocation, certificate generation, certificate renewal, and the exporting and importing of digital certificates and cryptographic keys.

In an embodiment, the application programming interface 108 provides an application 112 hosted by the client computer system 104 with the ability to perform certificate management operations programmatically using a network call. In an embodiment, the certificate management server 102 provides a command line interface that is used interactively by user or, in some embodiments, programmatically by an application. In an embodiment, the command line interface supports a scripting language that is used to automate complex certificate management tasks. In an embodiment, the client computer system 104 may be a personal computer system, server computer system, virtual computer system, notebook computer system, tablet computer system, cell phone, wearable device, or appliance. In an embodiment, the application 112 is a set of instructions deployed by a customer and hosted by the client computer system 104. In an embodiment, API calls are transmitted to the certificate management server over secure socket layer/transport layer security ("SSL/TLS") network connection. In an embodiment, API calls are authenticated using a digital signature generated with a cryptographic key accessible to the application 112. In an embodiment, an API call is generated by generating a request and adding a timestamp to the request. The resulting request is signed using the cryptographic key and provided to the certificate management server 102. In an embodiment, the request is valid for a threshold amount of time from the timestamp on the request, after which the request is no longer valid.

In an embodiment, the certificate management server 102 performs operations with a private certificate authority 114. In an embodiment, the certificate management server 102 is capable of allocating computing resources and configuring those resources to implement the private certificate authority 114 in accordance with the request received from the client computer system 104. In an embodiment, the certificate management server 102 performs certificate operations using the private certificate authority 114 including certificate generation, certificate revocation, and certificate renewal.

In an embodiment, a certificate authority is an entity that provides digital certificates which may be used to cryptographically verify the identity of the entity to which the digital certificate is issued. In an embodiment, the certificate authority controls a public-private key pair. In an embodiment, when the certificate authority receives a request for a digital certificate from a requester, the certificate authority confirms the information provided by the requester and generates a digital certificate in accordance with the rights of the requester to generate digital certificates. In an embodiment, the certificate authority signs the digital certificate with the private key of the certificate authority. By confirming the digital signature on the digital certificate with the public key of the certificate authority, and by confirming a digital signature of a purported entity with a public key in the digital certificate, the identity of the purported entity can be confirmed to be that which is represented in the digital certificate (to the extent that the certificate authority is trusted).

In an embodiment, a digital certificate is generated by an entity. The entity generates a public-private key pair and includes the public key with a digital certificate. The digital certificate may include other identifying information such as the name, address, or uniform resource locator ("URL") of the entity. In some examples, the entity signs the digital certificate with the private key, thereby creating a self-signed certificate. In other examples, the digital certificate is signed by a trusted third-party that confirms the information in the certificate. The entity may then prove its identity by providing the certificate to another party, and by signing a request, message or other piece of data with its private key. A recipient can use the public key in the provided certificate to confirm the signature, thereby verifying that the request, message or other piece of data was in fact signed by the owner of the private key (the entity indicated in the certificate). If the certificate is signed by a trusted third party, the verifying entity can be cryptographically assured that the trusted third-party has confirmed that the identity in the certificate is correct.

Figure 2:
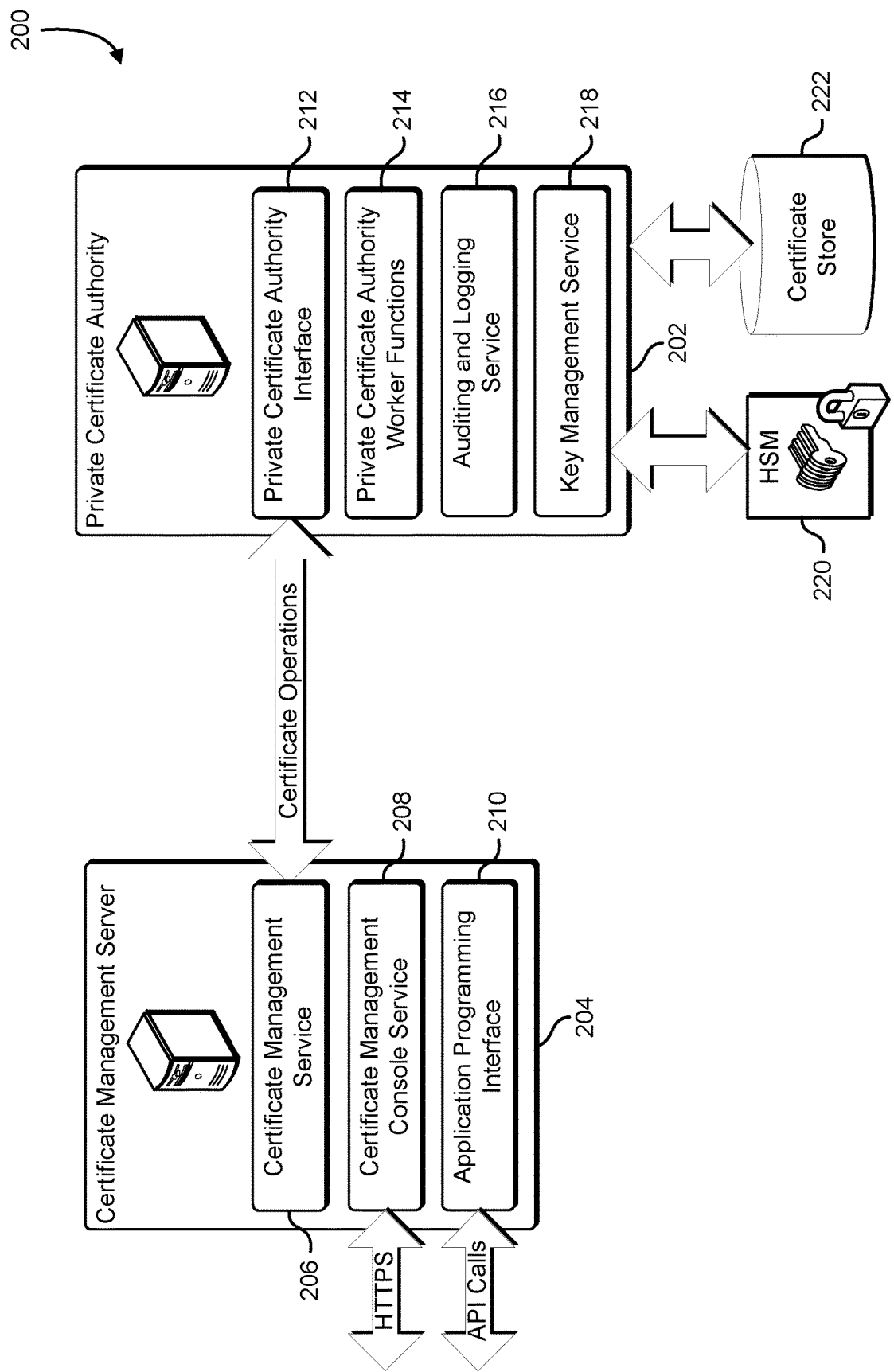
FIG. 2 illustrates an example of a certificate management server and a private certificate authority, in an embodiment.

FIG. 2 illustrates an example of a certificate management server and a private certificate authority, in an embodiment. In an embodiment, a system 200 includes a private certificate authority 202 and a certificate management server 204. In an embodiment, the private certificate authority 202 is a collection of computing resources allocated and managed by the certificate management server 204, and configured by the certificate management server 204 to operate as a certificate authority in accordance with parameters provided by user of the certificate management server 204. In an embodiment, the certificate management server 204 is a computer server, server cluster, virtual computer system, or computing device that hosts a certificate management service 206, a certificate management console service 208, and an application programming interface 210. The certificate management console service 208 and the application programming interface 210 may, in an embodiment, operate as described above in FIG. 1.

In an embodiment, the certificate management service 206 provides business logic that performs operations on certificate authorities and digital certificates. In an embodiment, the certificate management service 206 is able to create a private certificate authority, bring a private certificate authority online, import and export cryptographic information related to a private certificate authority, and disable a private certificate authority. In an embodiment, the certificate management service 206 provides business logic to create, revoke, renew, export, and import digital certificates. In an embodiment, the digital certificates managed by the certificate management service 206 may be private digital certificates issued by a private certificate authority created by the certificate management server 204. In an embodiment, the digital certificates managed by the certificate management service 206 are public digital certificates issued by a public certificate authority. In an embodiment, the certificate management service 206 may provide an interface to manage certificates issued by a plurality of both public and private certificate authorities.

In an embodiment, the private certificate authority 202 provides a private certificate authority interface 212. In an embodiment, the private certificate authority interface 212 is an application programming interface accessible to the certificate management server 204. In an embodiment, a set of private certificate authority worker functions 214 provides for the performance of certificate management operations.

In an embodiment, the customer generates the CA private key as follows:

1. In an embodiment, when the customer calls the CreateCA API, the API initiates a workflow to CreateCA, as part of which the signature generator polls SFN to look for a task to generate the private key. An embodiment of the CreateCA API is as follows:
CreateCA Request Parameters
CertificateAuthorityConfiguration Name and bit size of the private key algorithm, the name of the signing algorithm, and X.500 certificate subject information.
Type: CertificateAuthorityConfiguration
Required: Yes
RevocationConfiguration
Name of the S3 bucket that contains the CRL, a Boolean parameter which specifies whether the CRL is generated, and an optional alias for the CRL distribution point.
Type: RevocationConfiguration
Required: Yes
CertificateAuthorityType
Currently this must be SUBORDINATE.
Type: CertificateAuthorityType
Required: Yes
IdempotencyToken
Alphanumeric string that can be used to distinguish between calls to CreateCertificateAuthority. Idempotency tokens time out after 5 minutes. Therefore, if you call CreateCertificateAuthority multiple times with the same idempotency token within a 5 minute period, PCA recognizes that you are requesting only one certificate and will issue only one. If you change the idempotency token for each call, ACM PCA recognizes that you are requesting multiple certificates.
Type: IdempotencyToken
Required: No
Response
CertificateAuthorityArn
If successful, the Resource Name (RN) of the certificate authority (CA). This is of the form:
arn:acm:region:account:certificate-authority/12345678-1234-1234-123456789012
Type: ARN
Errors
CreateCertificateAuthority can throw the following exceptions:
  InvalidArgsException
  InvalidPolicyException
  LimitExceededException
2. The signature generator verifies the WireProtocol message signature using signing key and interacts with an HSM client to generate the CA private key based on the keytype provided by the customer.
3. In an embodiment, the signature generator talks with the datastore via a PrivateCA DAO Layer service to get the rest of the associated data for processing the request. It uses an HSM client to access an HSM for generating the private key. In the end, it exports wrapped keys from the HSM and stores them in the datastore. Later, when the key is needed again for signing, it loads the key into HSM memory.
4. In various embodiments, the PCA supports keytypes: RSA2048, RSA4096, EC p384, and EC p256.

In an embodiment, the private certificate authority 202 provides an auditing and logging service 216. In an embodiment, the auditing and logging service 216 records the performance of certificate management operations such as the creation, revocation, and expiration of digital certificates. In an embodiment, the auditing and logging service 216 records the use of cryptographic keys associated with the operation of the private certificate authority. In an embodiment, the private certificate authority 202 includes a key management service 218. In an embodiment, the key management service 218 manages cryptographic keys that are associated with the private certificate authority such as a public-private key pair used to sign digital certificates issued by the private certificate authority 202. In an embodiment, the key management service 218 uses a hardware security module ("HSM") 220 to store cryptographic keys.

In an embodiment, the operations the HSM can perform include the following:
  1. Creating a new key pair (RSA or ECC)
  2. Signing an ASN1 object, e.g., certificate, CSR, CRL, or OCSP response
  3. Wrapping a key (encrypt a private key using a symmetric key inside the HSM)
  4. Unwrapping a key (decrypt an encrypted private key using the same symmetric key in the HSM)

In an embodiment, operations such as backup, adding or removing a cluster is handled by an HSM or done manually using the HSM CLI via CMs.

In an embodiment, when private keys are created in the HSM they will be wrapped and their encrypted form stored in the database. In an embodiment, this key cannot be decrypted by anything but an HSM instance in the same cluster in which it was created so is never accessible outside of an HSM.

In an embodiment, the HSM is accessed by the signature generator (and by a signature generator auditor for verifying HSM logs and corresponding Signature generator operations), which runs on virtual machine instances within peered virtual networks as HSM instances. In an embodiment, the HSM access credential (user id and password) is encrypted by the key management system and stored in the database. In an embodiment, the signature generator service running on the virtual machine instances will need authorization to use the key management system to decrypt the HSM access credential, which is used when making calls to HSM. In an embodiment, in addition to the access credential, access to the HSM will use an additional certificate that allows the HSM client to authenticate to the HSM. In an embodiment, this certificate is generated via an offline ceremony, encrypted and stored separately from the access credential.

In an embodiment, the certificate management system uses a pool of HSM's managed by a load balancer to reduce the total number of HSM's needed to service a number of private certificate authorities. In an embodiment, the pool of HSM's store a master key that can be used to decrypt encrypted versions of cryptographic keys that are associated with private certificate authorities. In an embodiment, the pull of HSM's store a set of master keys where each key in the set of master keys is associated with a particular customer, and each customer may have a plurality of private certificate authorities under management. In an embodiment, the load balancer maintains a data store that records which keys are currently stored on each HSM.

In an embodiment, when the certificate management system generates a certificate signing request, the request is sent to the load balancer. In an embodiment, the request includes an encrypted version of the private key used to sign the digital certificate. In an embodiment, the private key is encrypted with a master key that may be customer-specific as described above. In an embodiment, if there is an available HSM that currently has access to the unencrypted version of the private key, the load balancer sends the request to the available HSM. In an embodiment, if there is not available HSM currently has access to the unencrypted version of the private key, the load balancer identifies the set of HSM's that have a copy of the master key with which the private key is encrypted, and selects a particular HSM from the set to process the request.

In an embodiment, when the HSM receives the request, the HSM uses the master key to decrypt the encrypted private key, and generates the digital signature using the plaintext version of the private key. In an embodiment, the plaintext version of the private key may be retained. In an embodiment, the plaintext version of the private key is removed, and notice of the removal of the plaintext version of the private key is provided to the load balancer.

In an embodiment, the load balancer may adjust the number of HSM's available to a particular customer or available to the pool at large by causing an HSM in the pool to transfer a master key to a new HSM. In an embodiment, the number of HSM's in the pool may be reduced by deleting the master key from an HSM.

In an embodiment, the certificate management system may precompute a number of private-public key pairs for use in creating new private certificate authorities. In an embodiment, when a request to create a new private certificate authorities received by the certificate management system, the certificate management system retrieves a key pair from the pool of precomputed key pairs if one is available. In an embodiment, the key pair may be precomputed on HSM during the request generation process, and the precomputed pair specified by the requester when the request is submitted to the certificate management system.

In an embodiment, both customer objects and PCA objects are encrypted using a key management service. In an embodiment, access to keys is managed by PCA via the key management service key policy and grants. In an embodiment, there are two types of keys: Storage keys and Internal keys. In an embodiment, storage keys are used to protect customer data at rest. In an embodiment, internal keys are used to protect PCA-related resources and communication between components, e.g., to initiate different workflows.

In an embodiment, the private certificate authority 202 stores information relating to the digital certificates in a certificate store 222. In an embodiment, the certificate store 222 is a database, data store, memory, or other physical storage device that is accessible to the private certificate authority 202. In an embodiment, the certificate store 222 may include a copy of certificates issued, expiration information for issued certificates, information on whether certificates are used, certificate revocation information, and security and policy information.

Figure 3:
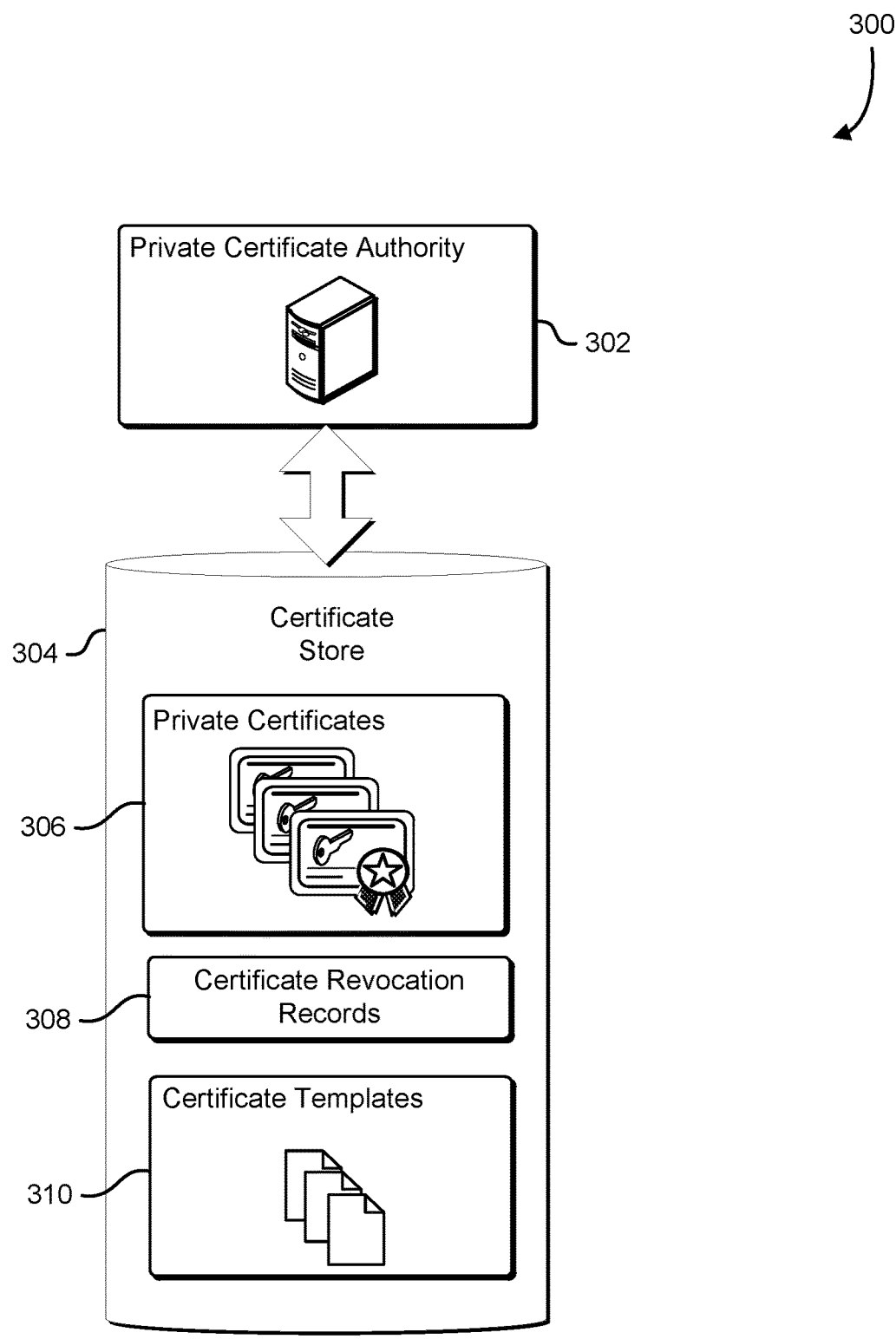
FIG. 3 illustrates an example of a certificate store used by a private certificate authority, in an embodiment.

FIG. 3 illustrates an example of a certificate store used by a private certificate authority, in an embodiment. In an embodiment, the system 300 includes a certificate store 304 that is used by a private certificate authority 302. In an embodiment, the certificate store 304 retains a set of private certificate information 306, a set of certificate revocation information 308, and a set of certificate templates 310.

In an embodiment, the set of private certificate information 306 includes information relating to private certificates issued by the private certificate authority 302. In an embodiment, the information may include copies of the certificates themselves, expiration information for issued certificates, and usage information for issued certificates. In an embodiment, the usage information includes information that allows the private certificate authority 302 to contact the owner of a digital certificate issued by the private certificate authority 302. In an embodiment, when a certificate is about to expire, the private certificate authority 302 may generate an updated digital certificate and provide the updated digital certificate to the owner of the digital certificate using the set of private certificate information 306. In an embodiment, the information allows the private certificate authority 302 to contact the owner of the digital certificate via a computer network and provide the updated digital certificate.

In an embodiment, the certificate store 304 includes a set of certificate revocation information 308. In an embodiment, the set of certificate revocation information may include a certificate revocation list ("CRL"), or information relating to an online certificate status protocol ("OCSP") revocation infrastructure. In an embodiment, the system includes the following revocation infrastructure. The PCA generates certificate revocation lists. In some embodiments, the system includes OCSP revocation infrastructure. CRL generation occurs via a process that looks at the PCA datastore for revoked certificates and generates a CRL every X days based at least in part on customer parameters provided to the revocation configuration as part of the CreateCA API call. When the customer calls RevokeCertificate, it triggers the async GenerateCRL job to update the CRL and reflect a newly revoked certificate. The CRL is stored in a customer data store which is provided as part of the revocation configuration as part of CreateCA API call. The following is a sample revocation configuration:

"RevocationConfiguration":
{
  "CrlConfiguration":
  {
    "Enabled": true,
    "ExpirationInDays": 1,
    "CustomCname": "foo",
    "StorageBucketUrl": "foo"
  }
}

In an embodiment, the certificate store 304 retains a set of certificate templates 310. In an embodiment, a template is used when creating a digital certificate. In an embodiment, the template describes a set of rules and policies that are enforced on certificates created by the private certificate authority 302.

Data at rest: In an embodiment, customer objects such as CSRs, Certificates, Templates, etc., containing potentially sensitive data are encrypted with a Storage Key. Each Storage Key is a unique data key per CA that is encrypted with a key management service CMK in the PCA account.

Figure 4:
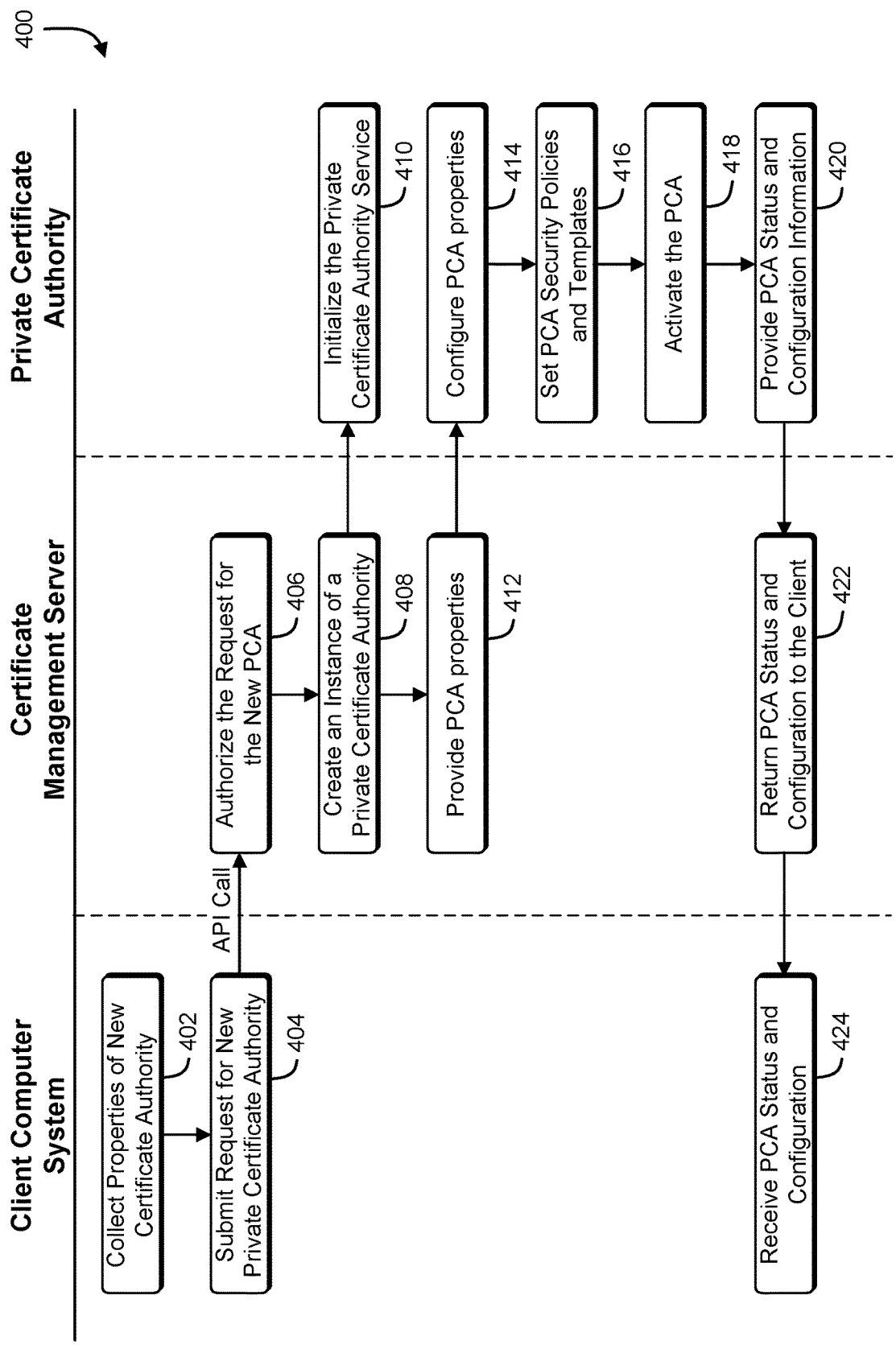
FIG. 4 illustrates an example of a process that, as a result of being performed by a client computer system, a certificate management server, and a private certificate authority, creates a new private certificate authority capable of issuing private digital certificates, in an embodiment.

FIG. 4 illustrates an example of a process 400 that, as a result of being performed by a client computer system, a certificate management server, and a private certificate authority, creates a new private certificate authority capable of issuing private digital certificates, in an embodiment. In an embodiment, the process begins at block 402 with a client computer system collecting properties for the creation of a new certificate authority. In an embodiment, the properties may include a subject, extension values, and other identifying information to be added to the certificate. In an embodiment, the properties may include a template that specifies one or more of these values. In an embodiment, at block 404, the client computer system submits the request to the certificate management server. In an embodiment, the request is authorized by a signature applied by the client computer system to the request which is verified by the certificate management server.

In an embodiment, at block 406, the certificate management server receives the request to create a new private certificate authority from the client computer system and authorizes the request. In an embodiment, the request is authorized by verifying a digital signature on the request. In an embodiment, the request is further authorized by confirming that a timestamp on the request is not older than a threshold amount of time to protect against request replay attacks. In an embodiment, at block 408, the certificate management server creates an instance of the private certificate authority by allocating a set of computing resources such as virtual computer systems, server computer systems, or runtime environments, and configures the set of computing resources to act as a private certificate authority. In an embodiment, the certificate management server provides configuration information to the private certificate authority, and the private certificate authority initializes itself at block 410. In an embodiment, at block 412, the certificate management server provides a set of properties to the private certificate authority based on information and an optional template provided with the request.

In an embodiment, at block 414, the private certificate authority receives the set of properties from the certificate management server and configures the private certificate authority accordingly. In an embodiment, at block 416, the private certificate authority configures security policies and templates in accordance with the request submitted by the client computer system. In an embodiment, at block 418, after the private certificate authority is configured, the private certificate authority is activated and begins accepting requests for digital certificates. In an embodiment, at block 420, the private certificate authority returns status and configuration information to the certificate management server. In an embodiment, at block 422 the certificate management server relays the status and configuration information to the client computer system, and the client computer system receives the status and configuration information at block 424.

Figure 5:
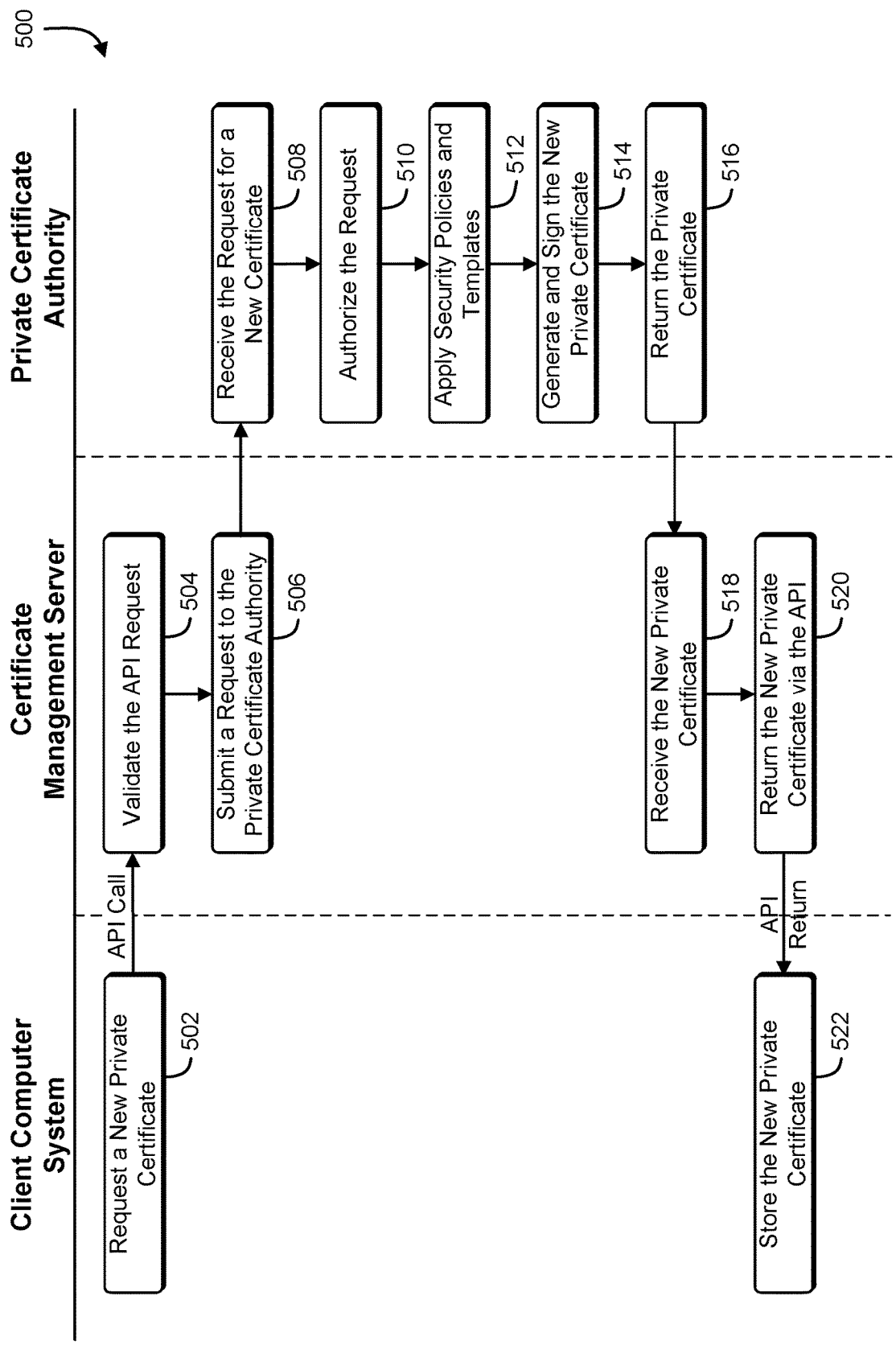
FIG. 5 illustrates an example of a process that, as a result of being performed by a client computer system, a certificate management server, and a private certificate authority, creates a new private digital certificate, in an embodiment.

FIG. 5 illustrates an example of a process 500 that, as a result of being performed by a client computer system, a certificate management server, and a private certificate authority, creates a new private digital certificate, in an embodiment. In an embodiment, at block 502, the client computer system requests a new private certificate from the certificate management server by calling an API made available by the certificate management server. In an embodiment, the request is generated by an application running on the client computer system, a user operating a command line interface, or via a web browser accessing a webpage provided by the certificate management server.

In an embodiment, at block 504, the certificate management server receives the request from the client computer system and validates the API request. In an embodiment, the API request is validated using a credential provided by the client computer system with the request. In an embodiment, the API request is validated using a digital signature of the request and a cryptographic key associated with the client computer system. In an embodiment, the cryptographic key is a public-private key pair, and the digital signature is generated by the client computer system using the private key and verified by the certificate management server using the public key. In an embodiment, at block 506, the certificate management server submits the request to the private certificate authority.

In an embodiment, at block 508, the private certificate authority receives the request for a new certificate from the certificate management server. In an embodiment, at block 510, the private certificate authority authorizes the request based at least in part on credentials provided by the client computer system with the request. In an embodiment, at block 512, the private certificate authority confirms that the request complies with security policies and templates of the private certificate authority. In an embodiment, at block 514, if the request is proper, the private certificate authority generates and signs the new private certificate with a private key of the private certificate authority. In an embodiment, the private certificate authority uses an HSM on which the private key is stored to generate a digital signature for the certificate. In an embodiment, at block 516, the private certificate authority returns the new private certificate to the certificate management server.

In an embodiment, at block 518, the certificate management server receives the new private certificate. In an embodiment, at block 520, the certificate management server returns the new private certificate via the API to the client computer system. At block 522, in an embodiment, the client computer system receives the new private certificate via the API and stores the private certificate.

Figure 6:
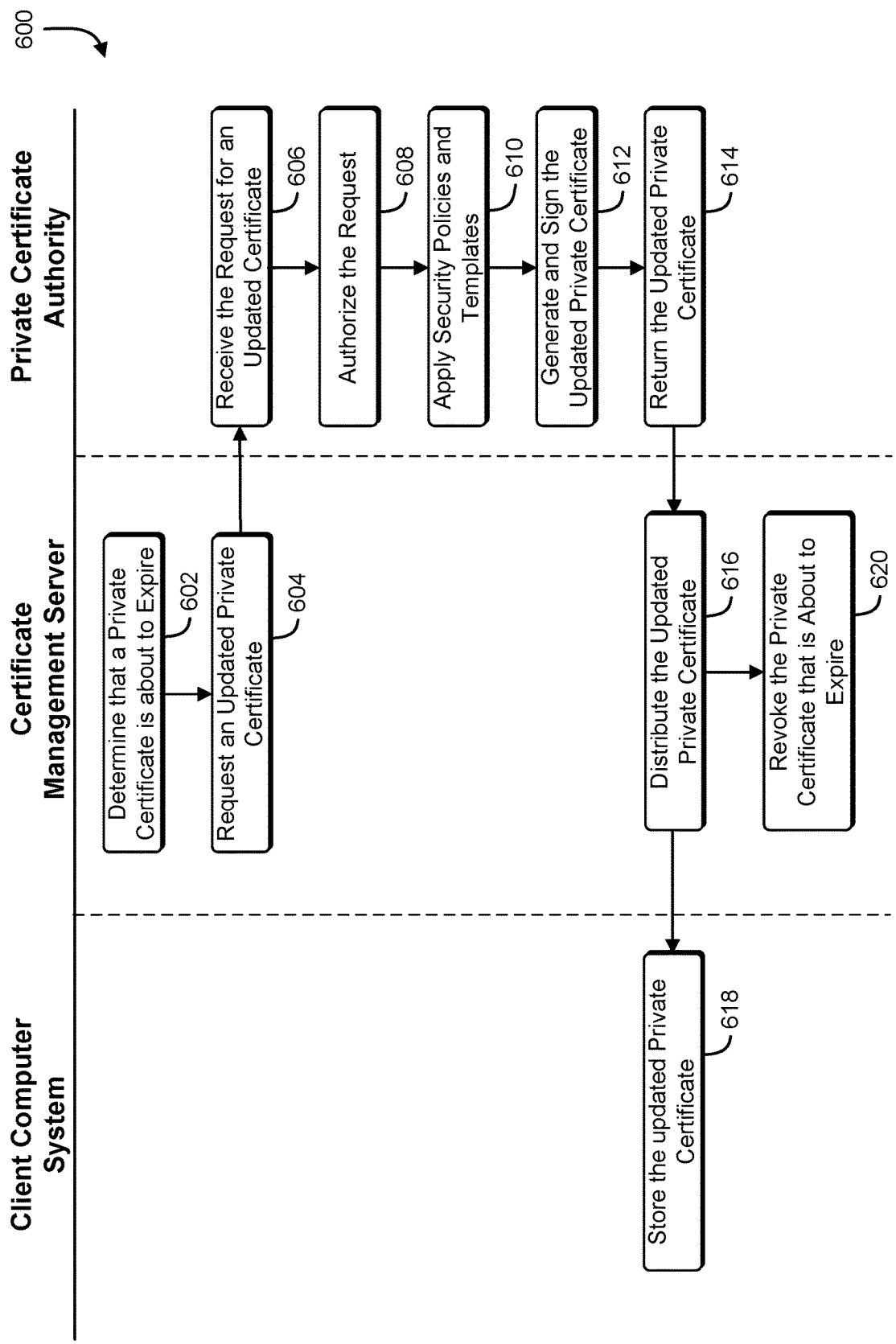
FIG. 6 illustrates an example of a process that, as a result of being performed by a client computer system, a certificate management server, and a private certificate authority, renews a private digital certificate, in an embodiment.

FIG. 6 illustrates an example of a process 600 that, as a result of being performed by a client computer system, a certificate management server, and a private certificate authority, renews a private digital certificate, in an embodiment. In an embodiment, the process begins at block 602 with the certificate management server determining that a private certificate is about to expire. In an embodiment, the certificate management server maintains a list of certificates being managed and determines that a certificate is about to expire when the expiration time of the private certificate is within a threshold amount of time provided by the customer. In an embodiment, the certificate management server determines that the private certificate is about to expire when the expiration time is reached. In an embodiment, the certificate management server determines that a private certificate is about to expire as a result of receiving notification from a certificate user that the certificate is no longer valid. In an embodiment, at block 604, the certificate management server generates a request for an updated private certificate and sends the request to the private certificate authority.

In an embodiment, at block 606, the private certificate authority receives the request for an updated certificate from the certificate management server. In an embodiment, at block 608, the private certificate authority authorizes the request based at least in part on credentials provided by the client computer system with the request. In an embodiment, at block 610, the private certificate authority confirms that the request complies with security policies and templates of the private certificate authority. In an embodiment, at block 612, if the request is proper, the private certificate authority generates and signs the updated private certificate with a private key of the private certificate authority. In an embodiment, the private certificate authority uses an HSM on which the private key is stored to generate a digital signature for the certificate. In an embodiment, at block 614, the private certificate authority returns the updated private certificate to the certificate management server.

In an embodiment, at block 616, the certificate management server receives an updated private certificate and the certificate management server returns the new private certificate to the client computer system via the API. At block 618, in an embodiment, the client computer system receives the updated private certificate via the API and stores the private certificate. In an embodiment, at block 620, after successfully providing the updated certificate to the client computer system, the certificate management server revokes the private certificate so that it may no longer be used.

Figure 7:
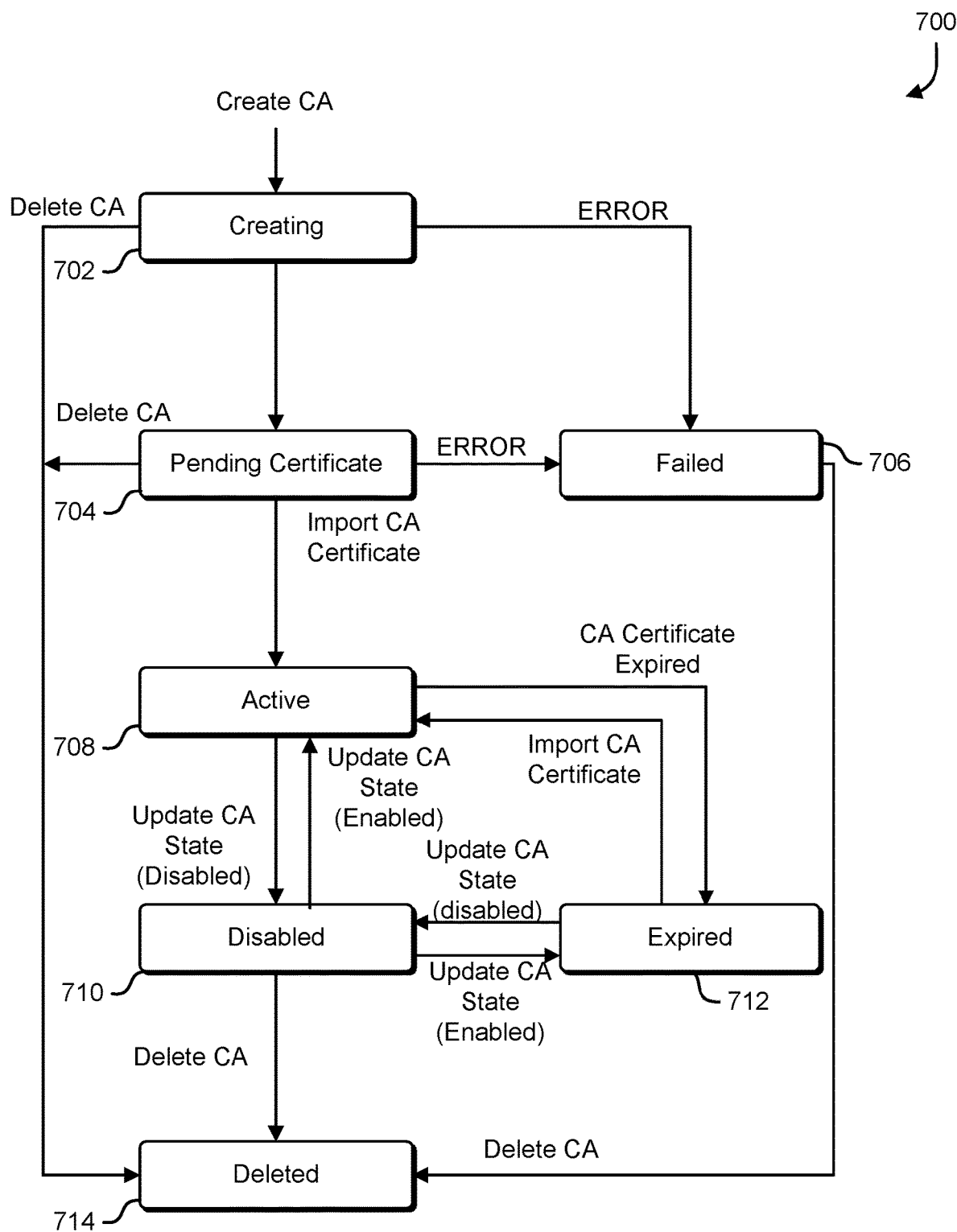
FIG. 7 illustrates an example of a lifecycle of a certificate authority, in an embodiment.

FIG. 7 illustrates an example of a lifecycle 700 of a certificate authority, in an embodiment. In an embodiment, when a certificate authority is first created by a certificate management server, the certificate authority is placed in creating state 702 in which the certificate authority is not fully configured and is not yet available to create digital certificates. In an embodiment, if an error occurs, the certificate authority is placed in a failed state 706. In an embodiment, as the certificate authority is initializing, the certificate authority eventually enters a pending certificate state 704 where the certificate authority is waiting for a parent certificate authority to sign the certificate of the private certificate authority.

In an embodiment, once the CSR is signed and the certificate is imported into the private certificate authority, the private certificate authority enters an active state 708. In an embodiment, from the active state 708, the private certificate authority can be disabled to enter a disabled state 710, or re-enabled to reenter the active state 708. In an embodiment, if the certificate is associated with the private certificate authority expires, the private certificate authority can enter an expired state 712. In an embodiment, if a new certificate is imported for the private certificate authority, the certificate authority reenters the active state 708. If a certificate authority is in the disabled state 710, the certificate authority may be deleted and enter a deleted state 714.

In an embodiment, the following example illustrates a process for creating a private certificate authority. In an embodiment, individual steps can be CA operations, which are exposed to customers via APIs:

1. In an embodiment, a customer initiates a request to create a CA either via a PCA Console or via an API with at the following inputs: CAType, CA Subject (CA identifier), SigningAlgorithm and optionally RevocationConfig (CRL).
2. In an embodiment, the PCA API sets up a new record in a database with status as CREATING. The API initiates a Step Function ("SFN") workflow for Creating a CA and creates a signed WireProtocol object, which is stored in the database separately. The PCA puts the payload-id associated with this wire protocol message in the Step Functions' JSON input parameters. These are used by the SFN worker to find the WireProtocol contents. SFN then finds the associate CA record based on the CA ARN in the WireProtocol message and decrypts the CA data to process the request.
3. In an embodiment, a signature generator polls the SFN periodically and looks for tasks and starts a workflow to generate a CA keypair when it finds a task.
4. In an embodiment, a PrivateCA Step function workers ("SFWs") polls SFN for tasks such as createCSR, signCSR, createToBeSignedCertificate, etc. Various ASN1 objects, such as the certificate signing request ("CSR"), ToBeSignedCertificates, etc., are created via the PrivateCA SFWs. Once processed, PCA SFW stores the result in the database and returns the response back to the SFN. A Certificate Signing Request is a block of encoded text given to CA when applying for a certificate.
5. In an embodiment, the signature generator uses the CA private key to sign whatever is provided to it. It polls the SFN for new tasks. In this workflow, the task generates a signature for the unsigned CSR object. The signature generator validates the input message using a signing key (Generated by a PCA KeyGen package (described elsewhere in this document)). The signature generator generates the signature using the CA private key and adds it to the original WireProtocol message. Another PCA SFW then takes that signature and incorporates it to a To Be Signed ("TBS") structure to make a signed CSR. At this point, the CA state is changed to PENDING CERTIFICATE.
6. In an embodiment, the customer then calls the GetCACSR API, signs the CSR using the parent CA, and imports the signed certificate into the PCA using the ImportCACertificate API. Then CA state is changed to ACTIVE.
7. In an embodiment, once a CA is active, it can sign certificates with its private key to assert that the public key in the certificate identifies the person, organization, server or other entity identified in the certificate subject. Applications can use the public key from the trusted CA certificate to verify that the CA signed the certificate.

Figure 8:
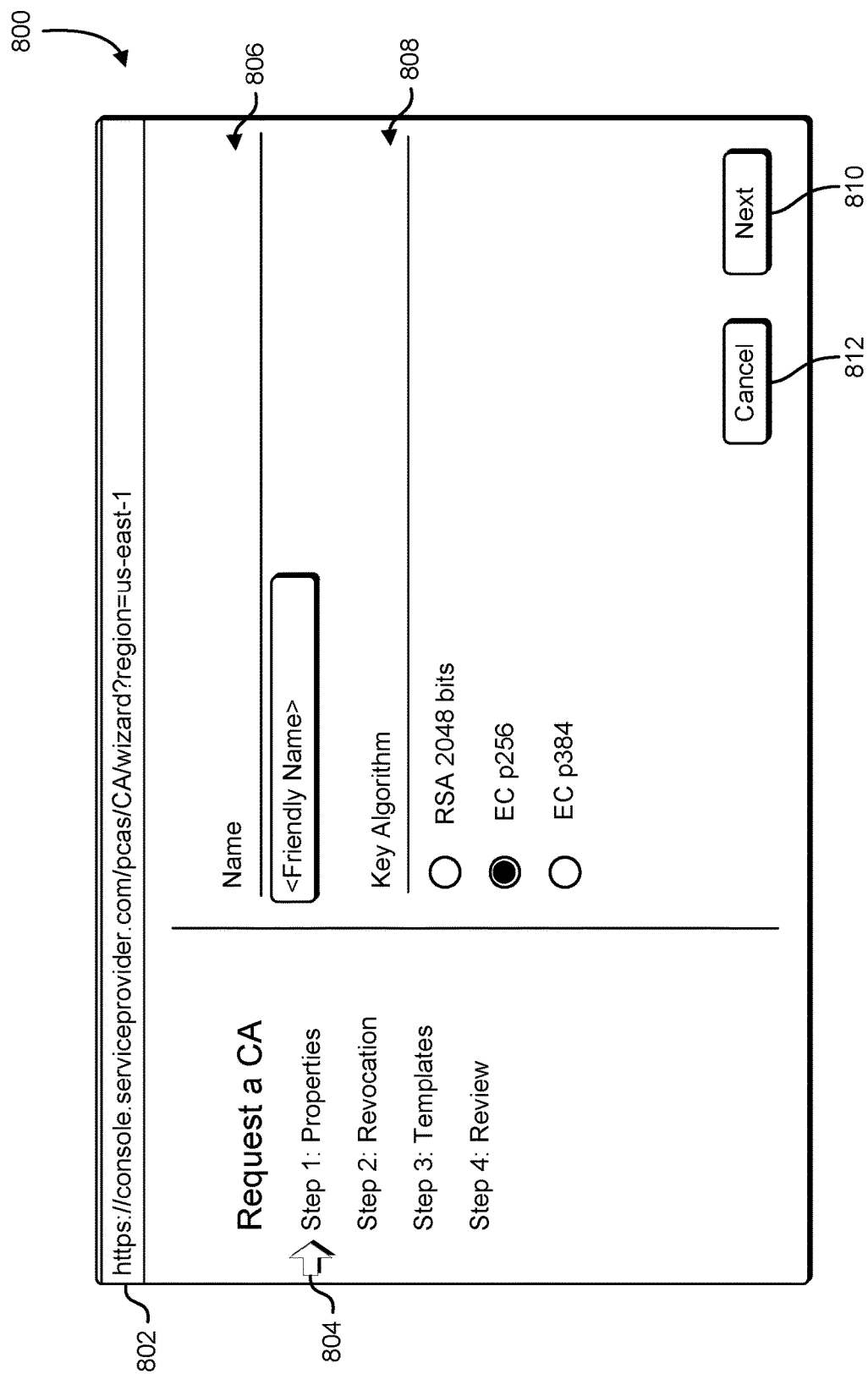
FIG. 8 illustrates an example of a user interface for creating a new private certificate authority, in an embodiment.

FIG. 8 illustrates an example of a user interface 800 for creating a new private certificate authority, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 8 allows the operator to set properties 804 associated with the creation of a certificate authority. In an embodiment, a uniform resource locator ("URL") 802 for the webpage is shown at the top of the display.

In an embodiment, the user interface provides a name region 806 for entering the name of the private certificate authority. In an embodiment, the name is used within the certificate manager to describe the certificate authority to the operator. In an embodiment, the user interface provides a Key algorithm selection area 808 in which the operator may choose a signing algorithm to be used by the private certificate authority when issuing digital certificates. In an embodiment, the user interface provides a "next" button 810 to advance to a next step in the process and a cancel button 812 to abort the process.

Figure 9:
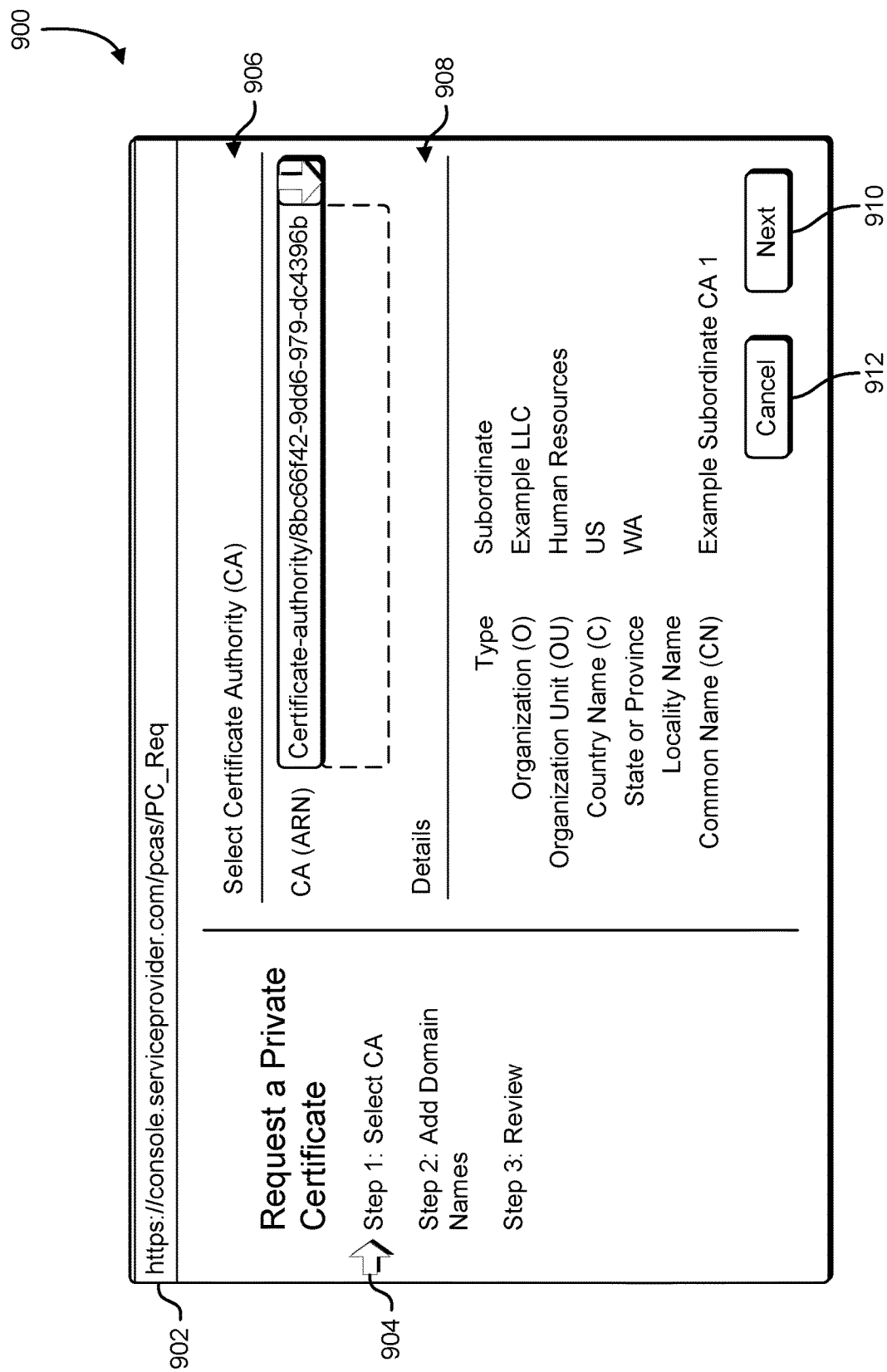
FIG. 9 illustrates an example of a user interface for creating a new private certificate, in an embodiment.

FIG. 9 illustrates an example of a user interface 900 for creating a new private certificate, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 9 allows the operator to select a certificate authority. In an embodiment, a uniform resource locator ("URL") 902 for the webpage is shown at the top of the display.

In an embodiment, the user interface provides a progress region 904 that illustrates a step progression associated with requesting a private certificate. In an embodiment, at step one of this progression, a certificate authority is selected for the private certificate authority. In an embodiment, a selection region 906 provides a drop-down dialog box with a set of certificate authorities that may be chosen by the operator. In an embodiment, when a user selects a particular certificate authority in the drop-down box, a details region 908 displays additional information about the selected certificate authority. In an embodiment, the user interface provides a "next" button 910 to advance to a next step in the process and a cancel button 912 to abort the process.

Figure 10:
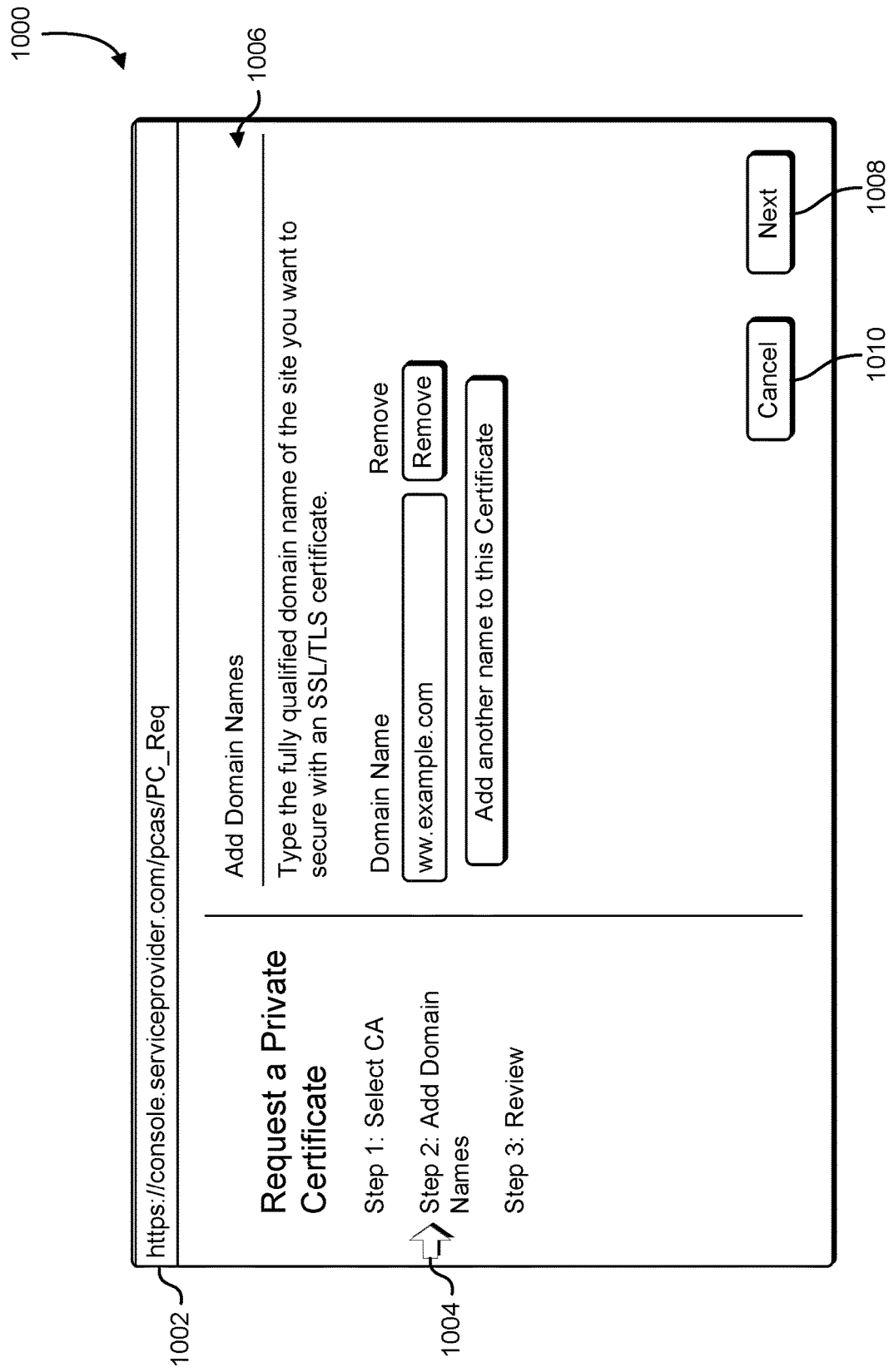
FIG. 10 illustrates an example of a user interface for adding domain names to a new private certificate, in an embodiment.

FIG. 10 illustrates an example of a user interface 1000 for adding domain names to a new private certificate, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG.

10 allows the operator to add a domain name to a private certificate. In an embodiment, a uniform resource locator ("URL") 1002 for the webpage is shown at the top of the display.

In an embodiment, the user interface provides a progress region 1004 that illustrates a step progression associated with requesting a private certificate. In an embodiment, at step two of this progression, domain names are added to the private certificate. In an embodiment, an entry region 1006 provides a text entry box for the operator to enter a particular domain name. In an embodiment, a 'remove' button causes the entered name to be removed from the digital certificate and an 'add' button causes an additional domain name to be added to the digital certificate. In an embodiment, the user interface provides a "next" button 1008 to advance to a next step in the process and a cancel button 1010 to abort the process.

Figure 11:
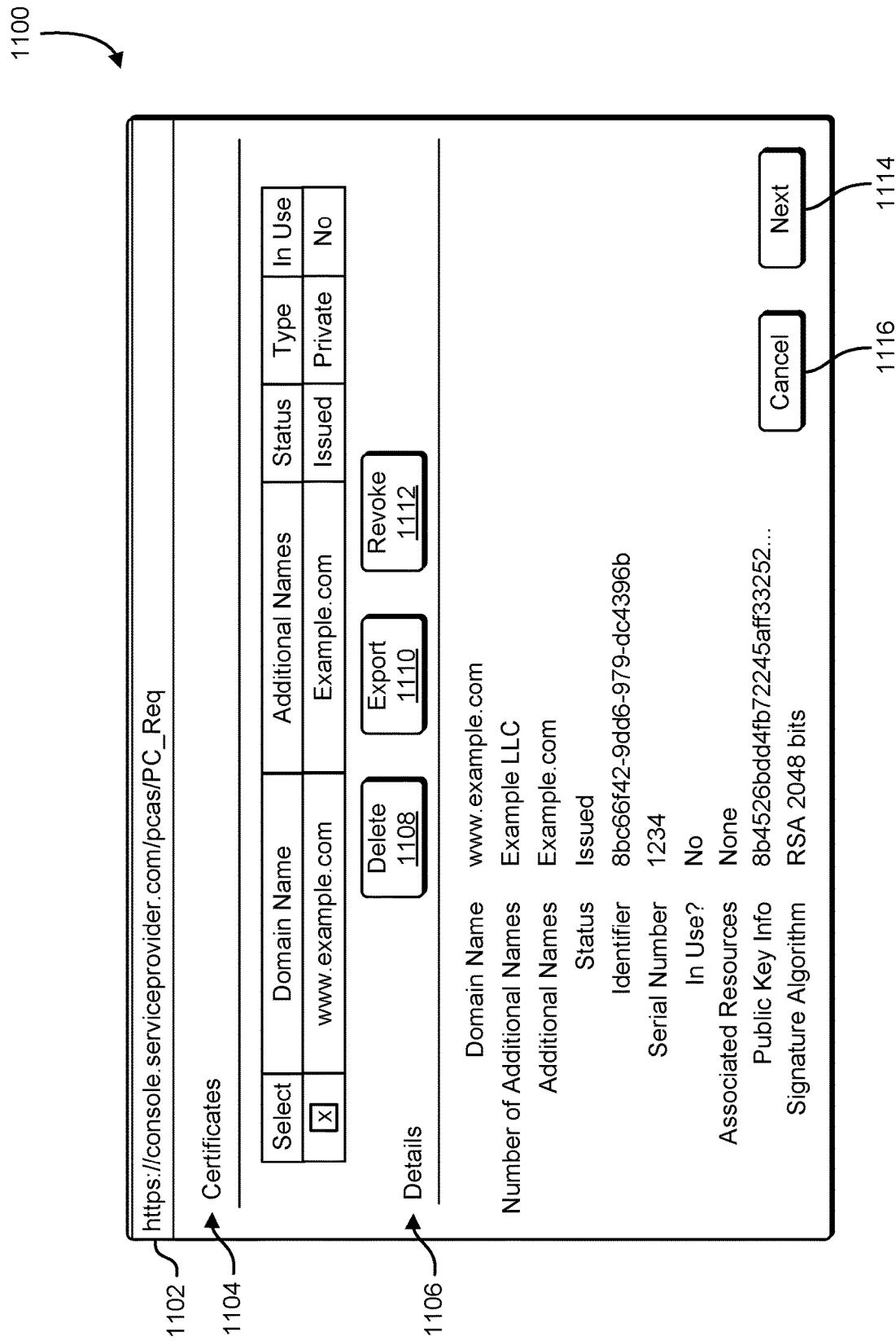
FIG. 11 illustrates an example of a user interface for managing a private digital certificate, in an embodiment.

FIG. 11 illustrates an example of a user interface 1100 for managing a private digital certificate, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 11 allows the operator to perform certificate management operations on a private digital certificate. In an embodiment, a uniform resource locator ("URL") 1102 for the webpage is shown at the top of the display.

In an embodiment, the user interface provides a certificate display region 1104 and a detail region 1106. In an embodiment, the certificate display region 1104 displays a list of certificates managed by the certificate manager. In an embodiment, the detail region 1106 displays additional details for the currently selected certificate. In an embodiment, three buttons in the certificate display region 1104 allow certificate-management operations to be performed on the selected certificate. In an embodiment, the user interface includes a delete button 1108 that causes the selected certificate to be deleted, an export button 1110 that causes the selected certificate to be exported, and a revoke button 1112 that causes the selected certificate to be revoked. In an embodiment, the user interface provides a "next" button 1114 to advance to a next step in the process and a cancel button 1116 to abort the process.

In an embodiment, access to various PCA resources is controlled via security roles. In an embodiment, each worker will have its own role so that a worker can be granted access only to the resource that it needs instead of giving broad access to numerous PCA resources.

In an embodiment, the PCA primarily relies on the key management system to protect customer data. In an embodiment, customer data is envelope-encrypted with a storage key which is generated for each Private CA instance from a CMK owned by the PCA service account. In an embodiment, the encrypted storage key will be stored in the database in the PrivateCA table and be passed to DAO calls that support encryption (Generally tables containing customer data related to a CA).

In an embodiment, each worker has an associated key pair which it uses to sign and verify the messages before starting any execution. In an embodiment, to guard against rogue workflows each worker will be required to sign the output it produces, with its private key, so that other workers can verify that a worker they trust generated the output. In an embodiment, each worker will extract necessary input that it requires to process the request from a specific worker output.

In an embodiment, the system takes actions to prevent the improper issuance of a Certificate. Since issuing a certificate goes through multiple steps (i.e., workflow workers), improperly issuing a certificate either due to a PCA software bug or a rogue actor injecting a request into the workflow is a possible threat to the PCA. In an embodiment, each request is validated at every step before it can be processed by any of the components. In an embodiment, without access to the appropriate key management system key, request processing fails. Once the certificate is created, it may be validated using the CA certificate for additional protection.

In an embodiment, the private CA may be used for issuing many types of certificates, including private certificates for TLS, Code Signing, and VPN clients. Certificates and other ASN.1 resources that CAs sign vary in structure and the fields they include. For example, certificates may or may not include standard extensions such as Subject Alternative Names, and they may or may not include custom extensions defined by customers. To meet the requirements of being able to sign a wide variety of ASN.1 resources, and to give customers flexibility in what information is included in their private certificates, the system provides a template system that allows the system to control the format and structure of the certificates issued. In an embodiment, templates may be provided to customers, allowing them to control the format and contents of the certificates they issue.

In an embodiment, for programmatic access, the signature generator hosts will have an HSM client installed. The authentication username and password will be encrypted via KMS and stored in a database. The ability to decrypt this credential is controlled by the policy on the encryption key in KMS. For administrative access, operations will be performed by the HSM utilities directly, which will require a quorum of m security officers out of n. The main operation that will be done administratively is creating a new HSM cluster and initializing it, or destroying an HSM cluster.

In an embodiment, the system supports the creation of a subordinate CA, generation of a certificate signing request (CSR) for the CA, and importing a CA certificate signed by a parent CA. The system may also support issuing certificates from the Private CA from a customer-generated certificate request (CSR). The customer-provided CSR specifies the Subject and Subject Alternative Names but not Extensions. The system may also support retrieving (Get) certificates, revoking certificates, generating a certificate revocation lists (CRLs) and depositing them into a customer's data storage space, generating an audit report showing certificates issued by the CA, requesting certificates from the CA from CM and using CM to manage private certificates, DeleteCA, DisableCA, ListCAs, and DescribeCA.

In an embodiment, a computing resource service provider hosts a private certificate authority that can be configured and used by a customer to generate, issue, renew, and revoke private certificates for internal use within the customer's organization. In an embodiment, a private CA is able to manage the issuance, validation and revocation of private certificates within a private network (i.e., not the public internet). The private CA is comprised of a CA certificate (a cryptographic building block upon which certificates can be issued), and a set of run-time services (the Certificate Revocation List) and Online Certificate Status Protocol). In an embodiment, when network entities attempt to connect with one another, the entities check the CRL and OSCP for the status of the certificates that each entity presents. If the certificates are valid, a "handshake" is performed between the resources which cryptographically proves the identity of each entity to the other and creates an encrypted communication channel (TLS/SSL) between them.

In an embodiment, private certificates may be used to identify resources within an organization, such as applications, services, devices and users. For example, in establishing a secure encrypted communications channel, each endpoint may use a certificate and cryptographic techniques to prove its identity to the other endpoint. Internal API endpoints, web servers, VPN users, IoT devices, and many other applications are able to use private certificates to establish encrypted communication channels for their secure operation.

In an embodiment, the private certificate authority is accessible via an application programming interface and is able to be managed by a certificate manager. In an embodiment, the certificate manager is a service operated by the computing resource service provider that allows the customer to provision, manage, and deploy digital certificates for use with various services of the computing resource service provider. For example, the certificate manager may be used to deploy secure sockets layer/transport layer security ("SSL/TLS") certificates that are used to secure network communications and establish the identity of websites over the Internet. By managing digital certificates with the certificate manager, tasks such as certificate renewal, certificate upload, certificate revocation, and certificate purchasing may be handled automatically, or through a simplified certificate manager interface. In some implementations, certificates that are provisioned using the certificate manager are automatically uploaded to other services provided by the computing resource service provider.

In an embodiment, in addition to managing digital certificates issued by public certificate authorities, the certificate manager may be used to acquire and manage digital certificates provided by a private certificate authority. In this way, the certificate manager provides a common administrative interface for the management of both private and public digital certificates.

In an embodiment, enterprises can use private certificates to identify and secure applications, services, devices, and users within their organization. By using private certificates instead of public certificates, enterprises avoid leaking internal information and support customization in ways that public certificates do not allow.

In an embodiment, the private CA is implemented as a hosted certificate authority service. This allows enterprises to create their private CA using hardware and software resources provided by a computing resource service provider. The service provider (by way of the hosted private CA) performs the creating, managing, and securing of root certificates and private certificates. The service provider may also provide services to vend the certificate state. PCA customers are provided with security, configuration, management, and monitoring of a highly available private CA without having to hire a security and maintenance team. Using the Certificate Manager, customers can manage their certificates from a single console including creating, rotating, and revoking both public and private certificates. The certificate manager also manages certificate renewal for customers which helps prevent outages caused by certificate expiration. Customers can easily deploy private certificates on resources provided by the computing resource service provider, such as Elastic Load Balancers, content delivery networks ("CDNs"), and API endpoints. Customers can also export private certificates and deploy them where they are needed to identify resources, including on-premises servers and Internet of things ("IoT") devices.

In general, public CAs issue and validate certificates for resources on the public internet, whereas private CAs do the same for private networks. In general, applications and browsers are usually preconfigured to trust public certificates automatically by default (by being provided with a list of trusted public certificate authorities for example), whereas an administrator must explicitly configure applications to trust certificates issued by private CAs. Using a public CA can create problems for the customer because in order to be included in the list of trusted certificate authorities by browser and operating system vendors, public CAs must follow strict rules, provide operational visibility, and meet security standards imposed by the browser and operating system vendors. However, administrators of Private CAs can make their own rules for issuing private certificates, including practices for issuing certificates and what information a certificate can include.

In an embodiment, certificates provided via a private CA have various advantages over self-signed certificates. Self-signed certificates are those which are issued without a CA. Unlike certificates issued from a secure root maintained by a CA, self-signed certificates act as their own root. Self-signed certificates can be used to provide on the wire encryption but not to verify identity, and they cannot be revoked. They are generally less secure than certificates issued from a Private CA, but organizations sometimes use them because they are easy to generate, require no expertise or infrastructure, and many applications accept them. There are no controls in place for issuing self-signed certificates. Organizations that use self-signed certificates may incur a greater risk of outages caused by certificate expirations because it is difficult to the track the expiration dates of self-signed certificates.

In an embodiment, use of a PCA solves the problem of securely identifying resources in an organization. A PCA allows the customer to issue private certificates, which identify resources and provide a basis for trusted identity and communications. Examples of things that can be identified with private certificates include API endpoints, TLS/SSL servers, clients, machines, VPN users, IoT devices, and more.

In various embodiments, the PCA provides an API and management console for creating a private CA that can issue and revoke certificates. The PCA provides high availability, redundancy, backup, auditing, and monitoring. The PCA is integrated with a Certificate Manager. Customers create a PCA instance in the management console of the computing resource service provider, and then use the certificate manager console to select a CA from their list of private CAs or the computing resource service provider's public CA, and issue a certificate from the one they selected. The PCA stores the private keys used for issuing certificates on hardware security modules for key protection, which are validated to FIPS 140-2 Level 3 standards for protection against key compromises that could undermine trust in the CA. Customers control access to their PCA resources using security policies. Customers can quickly revoke trust in a compromised certificate which will cause clients to stop trusting it.

In an embodiment, the certificate manager service may be integrated directly with a public CA of the computing resource service provider, which allows customers to obtain public certificates from the computing resource service provider and use them to enable TLS/SSL for services provided by the computing resource service provider. In an embodiment, the private CA service is a feature that is added to the certificate manager that allows an enterprise to issue private certificates from a CA they control. The computing resource service provider operates the CA infrastructure, but customers control the issuance process including who can issue certificates, what fields and values are included in certificates, and how long certificates are valid. Customers can use the certificates to identify servers, clients, smart lights, vehicles, and more.

In an embodiment, the Private CA Service works with the certificate manager. When requesting a certificate from the certificate manager, the customer can choose either a private certificate from your own PCA CA or a public certificate from the computing resource service provider's public CA. The CM provides the customer with a single place that is able to manage both private and public certificates.

In some embodiments, tools are provided for automatically deploying certificates and installing them with applications, such as internal web servers. In some embodiments, customers that want certificates on virtual machine instances or on their own servers call CM APIs to retrieve the certificate and install it for use with their applications. The CM provides APIs for issuing and distributing certificates and automatic renewal.

In an embodiment, customers use security policies to specify who can do what with PCA resources, including CAs, Certificates, and Templates. In an embodiment, customers use pre-configured policies for common roles, such as certificate administrator, CA administrator, CA supervisor, auditor, and template administrator. Customers specify security policies to allow or deny permissions for actions and ARN-addressable PCA resources.

In various embodiments, the following CA key pairs (key types) are supported: 2048 bit and 4096 bit RSA and EC p256 and EC p384. The following signature algorithm combinations are supported: SHA1WITHRSA, SHA256WITHRSA, SHA384WITHRSA, SHA512WITHRSA, ECDSA-WITH-SHA1, ECDSA-WITH-SHA256, ECDSA-WITH-SHA384, ECDSA-WITH-SHA512. This list excludes DSA (DSA WITH SHA256) and RSASSAPSS (SSA-PSS is an alternative way to create signatures, compared with the most common method, which is PKCS #1 v1.5).

In an embodiment, while the PCA is a shared service, the resources created are only accessible to the account that created the PCA. When the customer uses the console or an API to create a private CA, the API returns an ARN. The ARN is an identifier that the customer uses to make additional calls to the private CA. Access to use the private CA is restricted through security policies that control which users, groups, and roles can perform which actions on which resources.

In an embodiment, the CM automatically renews PCA-issued private certificates if they are in use. In an embodiment, the CM does not renew a PCA-issued certificate that is not in use. A certificate is in use if a) it is bound to (associated with) other resources of the computing resource service provider, such as Load Balancers, orb) if the user has exported it since the certificate was issued or since the last time it was renewed. In an embodiment, the CM does not renew certificates that are not in use nor those that have not been exported since being issued or renewed.

In an embodiment, the certificate manager can obtain private keys in a number of ways. In an embodiment, the certificate manager can generate the private key for PCA-issued certificates. In an embodiment, an administrator can generate the private key and provide a certificate signing request (CSR) and request a certificate for the CSR from their PCA CA.

In an embodiment, PCA CAs and other CAs may be chained together to form CA hierarchies. An administrator can create a desired CA hierarchy by linking CAs together. For example, an administrator may have an offline root on premises operated by the administrator as the CA root of trust for the administrator's organization. The administrator can chain their PCA CA to their offline root by creating a CSR from their PCA CA, and signing it with their offline root. PCA CAs can be subordinate to the administrator's offline root CA, or to another PCA CA.

Definitions and Abbreviations

Certificate revocation list ("CRL"): a list of certificates that have been revoked. The list is used by clients (relying parties) to determine if a certificate can be trusted. If the certificate in question is on the revocation list, it should not be trusted.

Certificate policy ("CP"): A document maintained by a CA that describes the CA's policies for issuing and otherwise managing certificates.

Certification practices statement ("CPS"): A document maintained by a CA that describes the CA's practices for issuing and managing certificates.

Offline CA: a highly secure root that is never connected to a network. Offline CAs are typically stored in a secure physical enclosure, such as a safe, and used occasionally to issue or revoke certificates used by online CAs.

Online CA: a CA that is connected to the network and used for everyday certificate issuance and revocation.

Online certificate status protocol ("OCSP"): a protocol for checking the revocation status of a certificate. The protocol was designed to provide real-time revocation status and require less network bandwidth compared with certificate revocation lists.

public key infrastructure ("PKI"): a set of processes and policies for creating and managing digital certificates.

Private certificate: a certificate issued by and trusted only within an organization. In contrast to public certificates, which are trusted by browsers, operating systems, and applications by default, private certificates are only trusted if the root public key is explicitly installed in the trust stores of browsers, operating systems, and applications.

Public certificate: Public certificates are issued by public CAs and are trusted by default by most operating systems and browsers. Operating systems and browsers include trust stores that are configured to trust the root certificates of public certificate authorities by default. Public certificate authorities must operate according to specific practices and security standards, maintain good standing with the CA/Browser Forum and application software vendors, and provide visibility into their operations.

Root certificate: the base (root) certificate of a CA hierarchy, consisting of a self-signed certificate that binds the CA name to the public key, and signed by the private key. The root certificate of a CA is typically trusted by default by inclusion in trust stores.

Root key: the base (root) key pair of a CA hierarchy, consisting of a private and public key.

Self-signed certificate: authenticity is asserted only by the creator of the certificate. Similar to a driver's license issued or other photo ID issued by the driver. Self-signed certificates are not trusted by browsers, operating systems, and applications. Browsers that connect to a website with a self-signed certificate generate a warning indicating that the certificate is not trusted.

Certificate Signing Request ("CSR"): a block of encoded text given to CA when applying for a certificate.

Certificate Revocation List ("CRL"): a list of certificate serial numbers that have been revoked.

Online Certificate Status Protocol ("OCSP"): an Internet protocol used for obtaining the revocation status of a certificate.

TBSCertificate: ToBeSignedCertificate is a structure composed of public key and identifying information.

Registration Authority as a Service ("RAaS"): acts as a gatekeeper to restrict types of certificates a CA is allowed to sign.

Step Functions (SFN): in an embodiment, step functions are implemented as step functions. Step functions are a web service that enables the user to coordinate the components of a distributed application using a visual workflow.

Figure 12:
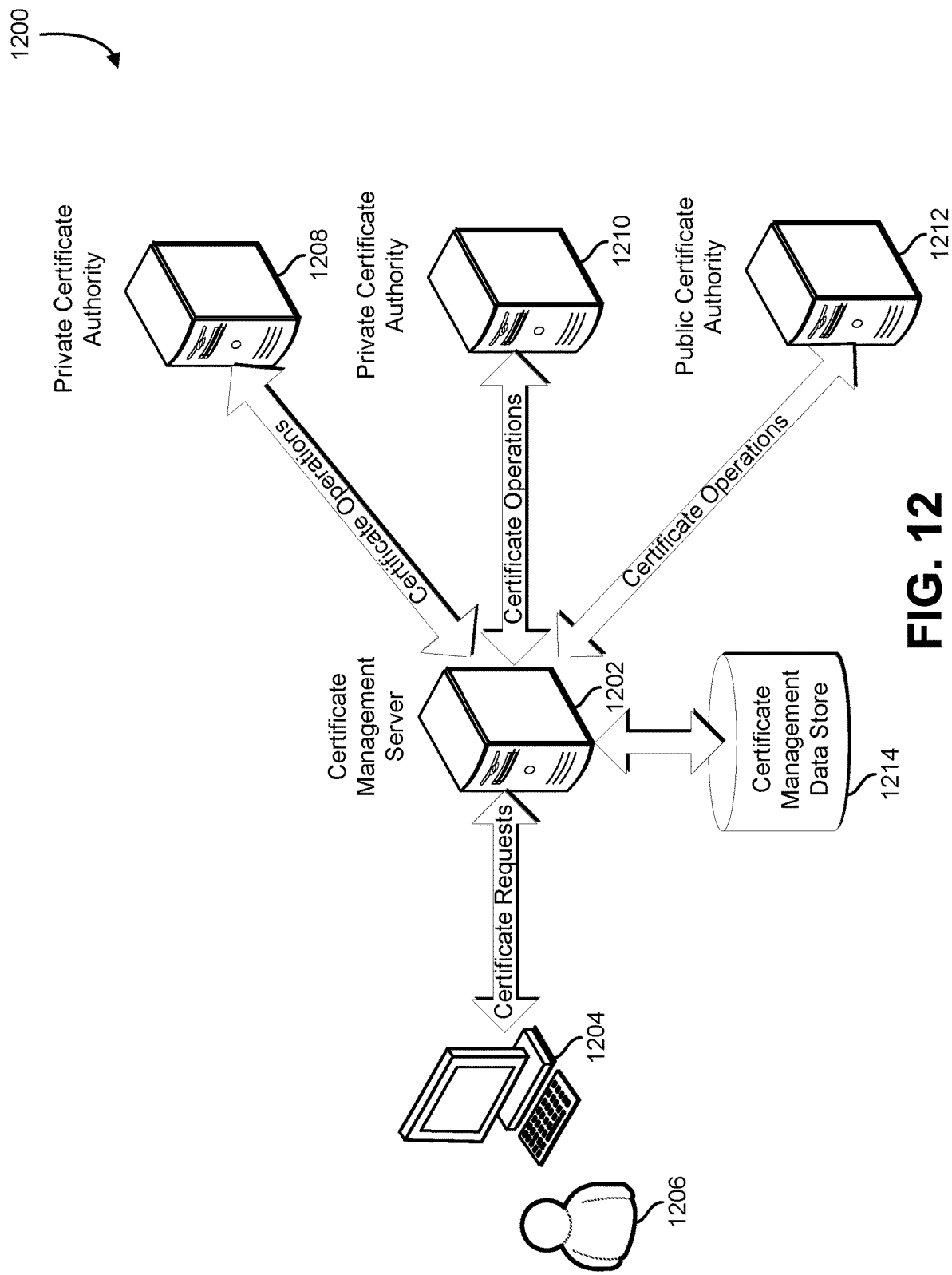
FIG. 12 illustrates an example of a multi-tenant certificate management service, in an embodiment.

FIG. 12 illustrates an example of a system 1200 that includes a certificate management server that manages digital certificates issued by a plurality of certificate authorities, in an embodiment. In an embodiment, the certificate management server 1202 may be a computer server, server cluster, virtual computer system, application runtime, or serverless execution environment, or computing appliance configured to execute a set of executable instructions that, as a result of being executed by one or more processors of the certificate management server 1202, cause the certificate management server 1202 to implement a certificate management service.

In an embodiment, the certificate management server 1202 provides an interface that allows the user 1206 to access the certificate management server 1202 via a client computer system 1204. In an embodiment, the client computer system 1204 may be a personal computer system, laptop computer system, cell phone, handheld device, tablet computer system, a thin client computer system, or computing device. In an embodiment, the client computer system 1204 hosts an application made up of executable instructions stored on a memory of the client computer system that, when executed by a processor on the client computer system 1204, cause the client computer system 1204 to communicate with the client management server 1202 in accordance with the interface. In an embodiment, the user 1206 obtains the status of the private certificate authority though the certificate management service using an implementation of the online certificate status protocol.

In an embodiment, the certificate management server 1202 implements a Web server that serves a set of webpages that can be downloaded to the client computer system 1204. In an embodiment, the set of webpages are received by the client computer system 1204 and rendered on a display using a browser hosted by the client computer system. In an embodiment, the web pages cause the client computer system 1204 to display the user interface for the certificate management service. In an embodiment, the webpages include interactive forms that allow the user 1206 to enter information associated with the creation and management of private certificate authorities and the management of digital certificates.

In an embodiment, the certificate management server 1202 provides certificate management services to a multitude of customers and users. In an embodiment, individual customers and/or users may create and control distinct sets of certificate authorities and digital certificates. In an embodiment, individual users from different businesses may use the certificate management server 1202 to generate separate private certificate authorities to generate digital certificates for their different businesses. In an embodiment, individual department heads within a business may use the certificate management server 1202 to generate separate private certificate authorities to secure digital entities within their respective departments. In an embodiment, the user 1206 can enable cross-account resource sharing by authorizing other users of the CRSP to use the user's private certificate authorities or digital certificates.

In an embodiment, the certificate management server 1202 manages certificates from a plurality of certificate authorities. In an embodiment, the certificate management server 1202 interacts with the first private certificate authority 1208, second private certificate authority 1210, and a public certificate authority 1212. In an embodiment, the private certificate authorities may be certificate authorities created by the certificate management server 1202. In an embodiment, the public certificate authority 1212 is a public certificate authority that issue certificates managed by the certificate management server 1202. In an embodiment, the certificate management server may generate private certificate authorities for multiple customers that may or may not be part of a shared signing chain. In an embodiment, the certificate management server perform certificate operations with the first private certificate authority 1208 and the second private certificate authority 1210 using an application programming interface provided by the respective certificate authorities. In an embodiment, the certificate management server 1202 performs certificate management operations with a public certificate authority 1212 by submitting certificate signing requests "CSRs" to the public certificate authority 1212 on behalf of the user 1206.

In an embodiment, the certificate management server 1202 establishes a certificate management data store 1214. In an embodiment, the certificate management data store 1214 stores information relating to the certificate authorities and certificates being managed by the certificate management server 1202. In an embodiment, for each private certificate authority, the certificate management data store 1214 records the owner of the certificate authority, identifying information for the certificate authority, templates associated with the certificate authority, and certificates issued by the certificate authority. In an embodiment, for each digital certificate managed by the certificate management server 1202, the certificate management data store 1214 records the certificate authority that issued the digital certificate, the entity using the digital certificate, and expiration information associated with the digital certificate. In an embodiment, the certificate management data store 1214 records a template used to create each digital certificate.

Figure 13:
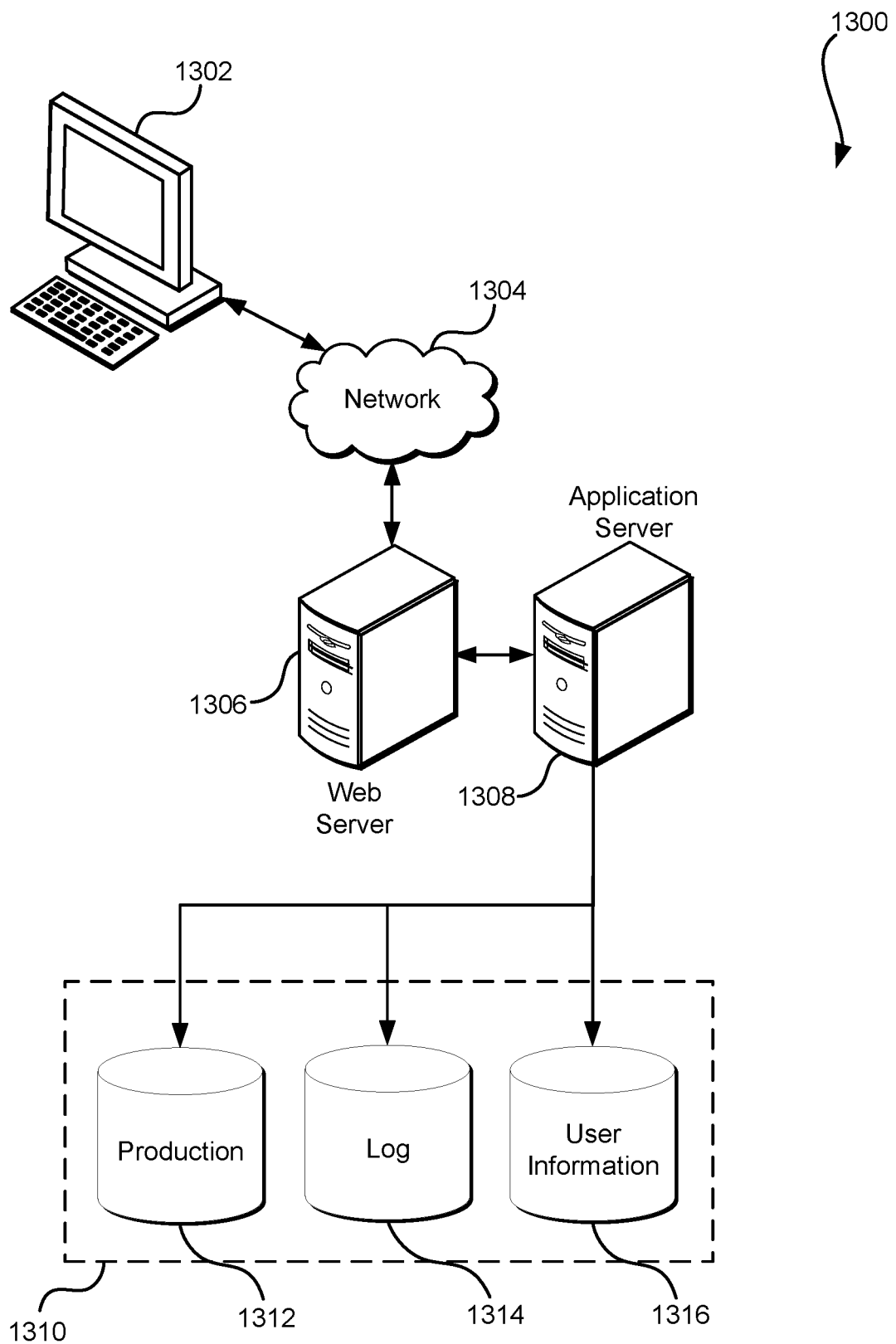
FIG. 13 illustrates a system in which various embodiments can be implemented.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto and the application server 1308 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1302. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie—Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie—Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $40=40$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors— for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, via a webpage provided by a console service, a first request to create a private certificate authority, the first request including one or more properties of the private certificate authority;
   creating the private certificate authority by allocating a set of computing resources;
   causing the private certificate authority to be associated with a Hardware Security Module (HSM) based at least in part on the one or more properties, the HSM storing a private key that is usable by the private certificate authority to create or manage one or more digital certificates;
   obtaining an indication of a permission that controls access to the private certificate authority;
   obtaining, via the webpage provided by the console service, a second request to create a digital certificate from the private certificate authority, wherein the second request comprises a selection of the private certificate authority from a plurality of private certificate authorities that include two or more private certificate authorities that are chained to form a hierarchy; and
   as a result of determining that the second request is associated with the permission, causing the private certificate authority to:
     create the digital certificate; and
     sign the digital certificate using the private key from the HSM.

2. The computer-implemented method of claim 1, wherein:
   the HSM includes a wrapping key; and
   the HSM obtains the private key by decrypting an encrypted version of the private key using the wrapping key.

3. The computer-implemented method of claim 1, further comprising:
   obtaining, via the webpage provided by the console service, a third request to create a subordinate certificate authority that is associated with the private certificate authority; and
   allocating a second set of computing resources to create the private certificate authority.

4. The computer-implemented method of claim 1, further comprising:
   obtaining, via the webpage provided by the console service, a third request to renew the digital certificate; and
   causing the private certificate authority to:
     generate an updated version of the digital certificate; and
     sign the updated version of the digital certificate using the private key from the HSM.

5. The computer-implemented method of claim 1, further comprising:
   obtaining, via the webpage provided by the console service, a third request to store a certification revocation list (CRL) generated by the private certificate authority; and
   storing the CRL into a data storage bucket that was indicated in the third request.

6. The computer-implemented method of claim 1, wherein the private key is either Rivest Shamir Adleman (RSA) 2048 or RSA4048.

7. The computer-implemented method of claim 1, wherein the one or more properties of the private certificate authority include subject information or identification information of the private certificate authority.

8. A system, comprising:
one or more processors; and
memory that stores computer-executable instructions that, as a result of being executed by the one or more processors, cause the system to:
obtain, via an Application Programming Interface (API), a first request to generate a private certificate authority, the first request includes identifying information of the private certificate authority;
in response to the first request, generate the private certificate authority using the identifying information;
cause a hardware security module (HSM) to store a private key, where the private key is usable by the private certificate authority;
obtain an indication that a permission is specified, wherein the permission determines access to the private certificate authority;
obtain, via the API, a second request to generate a digital certificate from the private certificate authority, wherein the second request is associated with the permission; and
as a result of choosing the private certificate authority among a set of certificate authorities that have at least two that are chained together using the second request, cause the private certificate authority to sign the digital certificate using the private key from the HSM.

9. The system of claim 8, wherein the computer-executable instructions further cause the system to:
obtain, via the API, a third request to renew the digital certificate; and
cause the private certificate authority to sign a new version of the digital certificate using the private key from the HSM.

10. The system of claim 8, wherein the second request includes an intent to configure automatic renewal of the digital certificate.

11. The system of claim 8, wherein the second request includes a selection of a signature algorithm from a set of signature algorithms to sign the digital certificate, the set of signature algorithms including Secure Hashing Algorithm (HSA) 256 with Rivest Shamir Adleman (RSA), SHA384 withRSA, and SHA512 withRSA.

12. The system of claim 8, wherein the private certificate authority is a root certificate authority.

13. The system of claim 8, wherein the computer-executable instructions further cause the system to:
obtain, via the API, a third request to delete the private certificate authority; determine that the private certificate authority is in a disabled state; and
delete the private certificate authority.

14. A non-transitory computer-readable storage medium storing thereon executable instructions that, as a result of being executed by one or more processors of a computer system, cause the computer system to:
in response to a first request obtained from a second computer system via a Command Line Interface (CLI), create a private certificate authority, where the private certificate authority is associated with a Hardware Security Module (HSM) that stores a private key;
obtain an indication that the private certificate authority is associated with a permission that controls access;
obtain, from the second computer system via the CLI, a second request for a digital certificate issued by the private certificate authority, wherein the second request includes a determination of the private certificate authority among a plurality of private certificate authorities that include a bundle of private certificate authorities that establish a certificate chain; and
in response to determining that the second request is associated with the permission provide, to the second computer system, the digital certificate by at least causing the private certificate authority to:
create the digital certificate; and
sign the digital certificate using the private key from the HSM.

15. The non-transitory computer-readable storage medium of claim 14, wherein the instructions further comprise instructions that, as a result of being executed by the one or more processors, cause the computer system to:
obtain, from the second computer system via the CLI, a third request to store a Certification Revocation List (CRL) associated with the private certificate authority; and
store the CRL into a data storage bucket that was indicated in the third request.

16. The non-transitory computer-readable storage medium of claim 14, wherein the private certificate authority is a subordinate certificate authority that is associated with a root certificate authority.

17. The non-transitory computer-readable storage medium of claim 14, wherein the HSM stores a wrapping key that is usable to encrypt the private key.

18. The non-transitory computer-readable storage medium of claim 14, wherein the second request includes an indication of a particular signature algorithm from a plurality of signature algorithms, the plurality of signature algorithms including Secure Hashing Algorithm (HSA) 256 with Rivest Shamir Adleman (RS A), SHA384 withRSA, and SHA512 withRSA.

19. The non-transitory computer-readable storage medium of claim 14, wherein the instructions further comprise instructions that, as a result of being executed by the one or more processors, cause the computer system to:
obtain, from the second computer system via the CLI, a third request to delete the private certificate authority; and
delete the private certificate authority in response to a determination that the private certificate authority is in a disabled state.

20. The non-transitory computer-readable storage medium of claim 14, wherein the second request indicates a subject and an identifier of the digital certificate.

* * * * *